US012756448B2

(12) United States Patent
Chisci et al.

(10) Patent No.: US 12,756,448 B2
(45) Date of Patent: Oct. 6, 2026

(54) MULTI-BEAM COMMUNICATIONS USING RECEIVER ASSISTANCE INFORMATION

(71) Applicant: QUALCOMM Incorporated, San Diego, CA (US)

(72) Inventors: Giovanni Chisci, San Diego, CA (US); Jing Sun, San Diego, CA (US); Xiaoxia Zhang, San Diego, CA (US); Yan Zhou, San Diego, CA (US); Vinay Chande, San Diego, CA (US); Siyi Chen, Beijing (CN); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 18/707,757

(22) PCT Filed: Jan. 24, 2022

(86) PCT No.: PCT/CN2022/073427
§ 371 (c)(1),
(2) Date: May 6, 2024

(87) PCT Pub. No.: WO2023/137743
PCT Pub. Date: Jul. 27, 2023

(65) Prior Publication Data
US 2024/0429993 A1 Dec. 26, 2024

(51) Int. Cl.
*H04B 7/06* (2006.01)
*H04W 28/08* (2023.01)

(52) U.S. Cl.
CPC .... *H04B 7/06964* (2023.05); *H04W 28/0925* (2020.05)

(58) Field of Classification Search
CPC ............. H04B 7/06964; H04B 7/0695; H04W 28/0925; H04W 16/14; H04W 74/0808; H04W 74/0816
See application file for complete search history.

(56) References Cited

U.S. PATENT DOCUMENTS 12,484,086 B2 * 11/2025 Pan .................... H04W 72/232
2015/0043450 A1 2/2015 Ariyavisitakul et al.
(Continued)

FOREIGN PATENT DOCUMENTS

CN 113016154 A 6/2021
WO WO-2020125121 A1 6/2020
WO 2021263161 A1 12/2021

OTHER PUBLICATIONS

R1-2112918, 37.213 CR 0023 revCurrent version: 16.6.0, 3GPP TSG RAN WG1 #107-e, e-Meeting, Nov. 11-19, 2021 (Year: 2021).*
(Continued)

*Primary Examiner* — Aristocratis Fotakis
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from one or more base stations, scheduling information for a multi-beam communication using a set of beams between the UE and the one or more base stations. The UE may perform, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant
(Continued)

according to the scheduling information using the receiver assistance information. Numerous other aspects are described.

30 Claims, 12 Drawing Sheets

(56) References Cited

U.S. PATENT DOCUMENTS

| | | | | |
|---|---|---|---|---|
| 2019/0373640 | A1 | 12/2019 | Sun et al. | |
| 2020/0252891 | A1* | 8/2020 | Chendamarai Kannan | H04B 7/088 |
| 2022/0124796 | A1* | 4/2022 | Salem | H04L 5/0051 |
| 2022/0394763 | A1* | 12/2022 | Wang | H04W 24/04 |
| 2023/0189020 | A1* | 6/2023 | Calcev | H04W 72/21 370/329 |
| 2023/0337277 | A1* | 10/2023 | Niu | H04W 74/006 |
| 2023/0354419 | A1* | 11/2023 | Yang | H04B 7/0617 |
| 2023/0361894 | A1* | 11/2023 | Bhamri | H04W 24/10 |
| 2024/0072877 | A1* | 2/2024 | Callender | H04B 7/088 |
| 2024/0244450 | A1* | 7/2024 | Liu | H04W 76/20 |

OTHER PUBLICATIONS

R1-2111707, "Channel access for multi-beam operation", Panasonic, 3GPP TSG RAN WG1 #107-e, e-Meeting, Nov. 11-19, 2021 (Year: 2021).*

R1-2111729, "Channel access mechanism for NR from 52.6 GHz to 71 GHz", Samsung, 3GPP TSG RAN WG1 #107-e, e-Meeting, Nov. 11-19, 2021 (Year: 2021).*

Convida Wireless: "Channel Access Mechanism for Supporting NR from 52.6 GHz to 71 GHz", 3GPP TSG RAN WG1 Meeting #107-e, R1-2112032, No. e-Meeting, Nov. 11, 2021-Nov. 19, 2021, 14 Pages, Nov. 19, 2021, sections 1, 3-6.

International Search Report and Written Opinion—PCT/CN2022/073427—ISA/EPO—Oct. 20, 2022.

Sony: "Channel Access Mechanism for 60 GHz Unlicensed Spectrum", 3GPP TSG RAN WG1 #107-e, R1-2111389, No. e-Meeting, Nov. 11, 2021-Nov. 19, 2021, 6 Pages, Nov. 19, 2021, Section 2.

* cited by examiner

MULTI-BEAM COMMUNICATIONS USING RECEIVER ASSISTANCE INFORMATION

CROSS-REFERENCE TO RELATED APPLICATION

This Patent Application is a 371 national stage of PCT Application No. PCT/CN2022/073427 filed on Jan. 24, 2022, entitled "MULTI-BEAM COMMUNICATIONS USING RECEIVER ASSISTANCE INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multi-beam communications using receiver assistance information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a transceiver, a memory; and one or more processors, coupled to the memory, configured to: receive, via the transceiver from one or more base stations, scheduling information for a multi-beam communication using a set of beams between the UE and the one or more base stations; and perform, with the one or more base stations via the transceiver, the multi-beam communication based at least in part on: receiver assistance information for the one or more beams in the set of beams associated with the multi-beam communication, and a policy to fulfil a grant according to the scheduling information, partially fulfil the grant according to the scheduling information, or not fulfil the grant according to the scheduling information using the receiver assistance information.

In some implementations, an apparatus for wireless communication at a base station includes a transceiver, a memory; and one or more processors, coupled to the memory, configured to: transmit, via the transceiver to a UE, scheduling information for a multi-beam communication between the base station and the UE using a set of beams; and perform, with the UE via the transceiver, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information.

In some implementations, a method of wireless communication performed by a UE includes receiving, from one or more base stations, scheduling information for a multi-beam communication using a set of beams between the UE and the one or more base stations; and performing, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information.

In some implementations, a method of wireless communication performed by a base station includes transmitting, to a UE, scheduling information for a multi-beam communication between the base station and the UE using a set of beams; and performing, with the UE, the multi-beam communication based at least in part on: receiver assistance information for the one or more beams in the set of beams associated with the multi-beam communication, and a policy for fulfilling a grant according to the scheduling information, partially fulfilling the grant according to the scheduling information, or not fulfilling the grant according to the scheduling information using the receiver assistance information.

In some implementations, a non-transitory computer-readable medium storing a set of instructions for wireless communication includes one or more instructions that, when executed by one or more processors of a UE, cause the UE to: receive, from one or more base stations, scheduling information for a multi-beam communication using a set of beams between the UE and the one or more base stations;

and perform, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information.

In some implementations, a non-transitory computer-readable medium storing a set of instructions for wireless communication includes one or more instructions that, when executed by one or more processors of a base station, cause the base station to: transmit, to a UE, scheduling information for a multi-beam communication between the base station and the UE using a set of beams; and perform, with the UE, the multi-beam communication based at least in part on: receiver assistance information for the one or more beams in the set of beams associated with the multi-beam communication, and a policy for fulfilling a grant according to the scheduling information, partially fulfilling the grant according to the scheduling information, or not fulfilling the grant according to the scheduling information using the receiver assistance information.

In some implementations, an apparatus for wireless communication includes means for receiving, from one or more base stations, scheduling information for a multi-beam communication using a set of beams between the UE and the one or more base stations; and means for performing, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information.

In some implementations, an apparatus for wireless communication includes means for transmitting, to a UE, scheduling information for a multi-beam communication between the base station and the UE using a set of beams; and means for performing, with the UE, the multi-beam communication based at least in part on: receiver assistance information for the one or more beams in the set of beams associated with the multi-beam communication, and a policy for fulfilling a grant according to the scheduling information, partially fulfilling the grant according to the scheduling information, or not fulfilling the grant according to the scheduling information using the receiver assistance information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
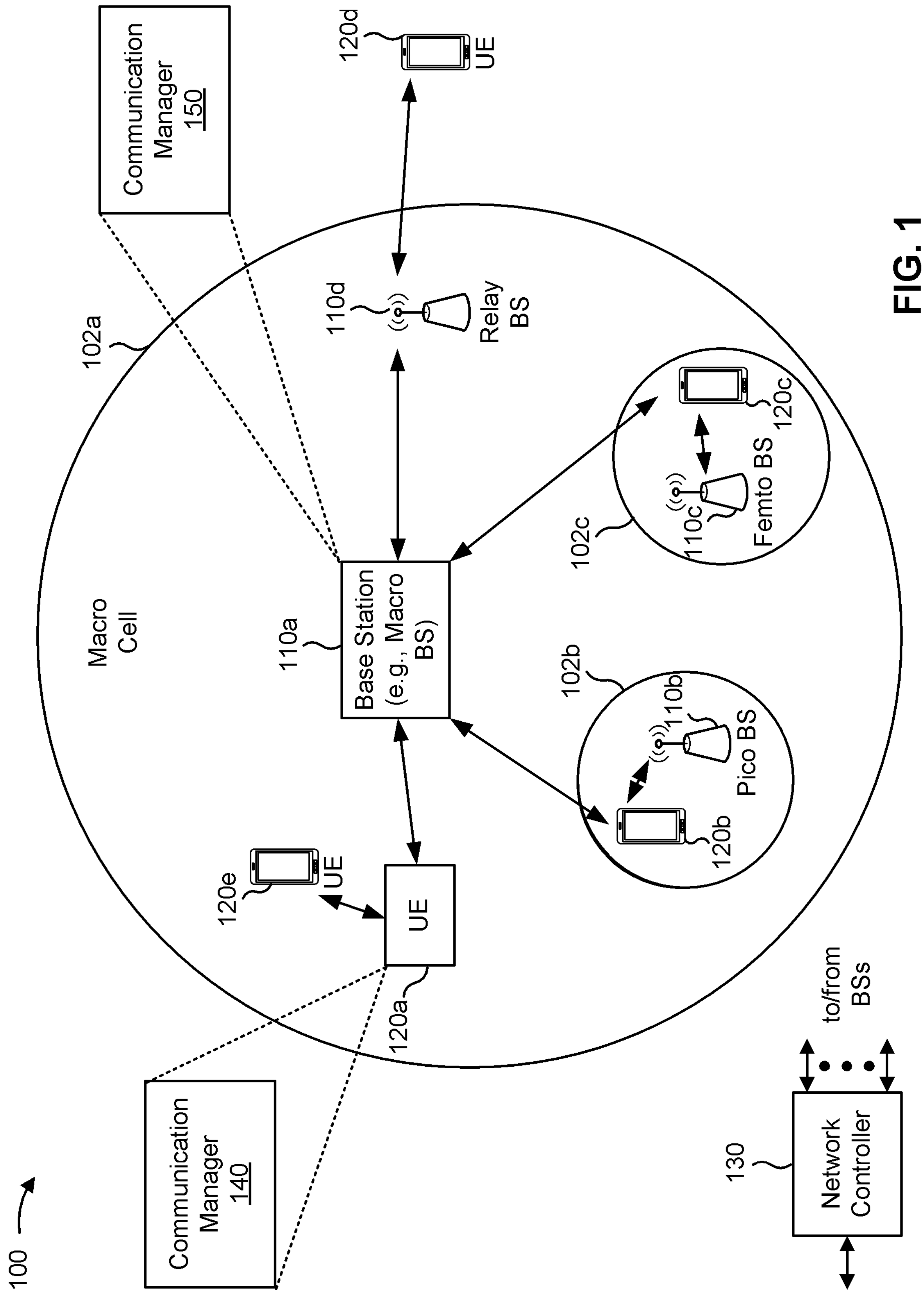
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

Abase station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from one or more base stations, scheduling information for a multi-beam communication using a set of beams between the UE and the one or more base stations; and perform, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE, scheduling information for a multi-beam communication between the base station and the UE using a set of beams; and perform, with the UE, the multi-beam communication based at least in part on: receiver assistance information for the one or more beams in the set of beams associated with the multi-beam communication, and a policy for fulfilling a grant according to the scheduling information, partially fulfilling the grant according to the scheduling information, or not fulfilling the grant according to the scheduling information using the receiver assistance information. Additionally, or alternatively, the communication manager 150 may perform one or more other operations described herein.

As indicated above, FIG. 1 is provided as an example. Other examples may differ from what is described with regard to FIG. 1.

Figure 2:
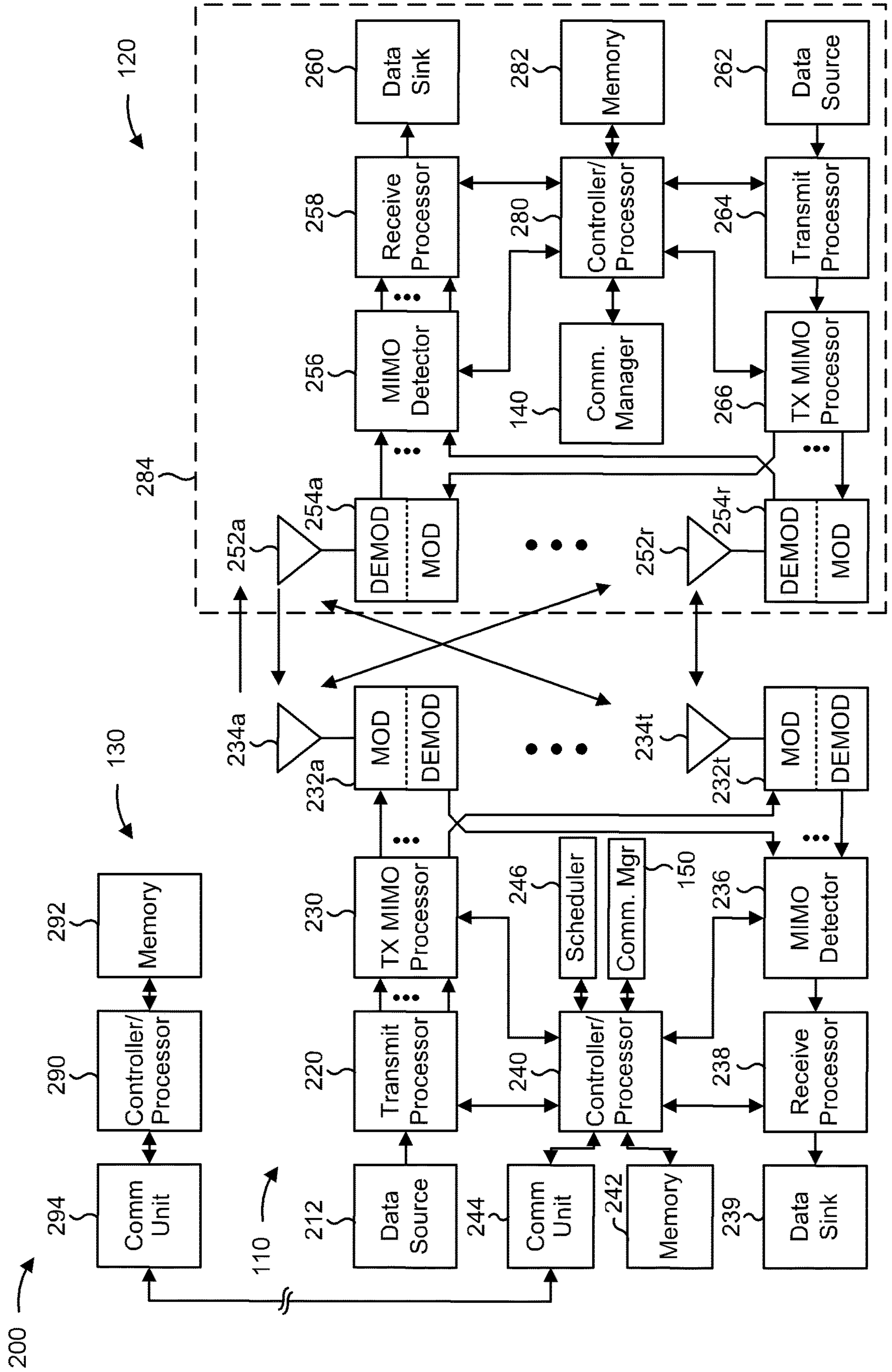
FIG. 2 is a diagram illustrating an example of abase station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with multi-beam communications using receiver assistance information, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from one or more base stations, scheduling information for a multi-beam communication using a set of beams between the UE and the one or more base stations (e.g., using antenna 252, modem 254, MIMO detector 256, receive processor 258, controller/processor 280, and/or memory 282); and/or means for performing, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information (e.g., using controller/processor 280, transmit processor 264, TX MIMO processor 266, modem 254, antenna 252, and/or memory 282, or using antenna 252, modem 254, MIMO detector 256, receive processor 258, controller/processor 280, and/or memory 282). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for transmitting, to a UE, scheduling information for a multi-beam communication between the base station and the UE using a set of beams (e.g., using controller/processor 240, transmit processor 220, TX MIMO processor 230, modem 232, antenna 234, and/or memory 242); and/or means for performing, with the UE, the multi-beam communication based at least in part on: receiver assistance information for the one or more beams in the set of beams associated with the multi-beam communication, and a policy for fulfilling a grant according to the scheduling information, partially fulfilling the grant according to the scheduling information, or not fulfilling the grant according to the scheduling information using the receiver assistance information (e.g., using antenna 234, modem 232, MIMO detector 236, receive processor 238, controller/processor 240, and/or memory 242, or using controller/processor 240, transmit processor 220, TX MIMO processor 230, modem 232, antenna 234, and/or memory 242). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a 60 GHz band, an initiating device (e.g., a UE or a base station) may employ listen-before-talk (LBT) to facilitate spectrum sharing. During LBT, before a single transmission or a burst of transmissions on an operating channel, the initiating device that initiates the transmission may perform a clear channel assessment (CCA) procedure in the operating channel. When the initiating device determines, based at least in part on the CCA procedure, that the operating channel is occupied, the initiating device may not transmit in the operating channel. When the initiating device determines, based at least in part on the CCA procedure, that the operating channel is no longer occupied, and the transmission was deferred for a quantity of empty slots defined by the CCA procedure, the initiating device may resume the transmission or enable another device to transmit on the operating channel.

The initiating device that initiates the transmission may perform the CCA procedure using an energy detection. The operating channel may be considered to be occupied for a slot time of 5 microseconds (μs) when an energy level in the operating channel satisfies an energy detection threshold. The initiating device may observe the operating channel for a duration of a CCA observation time measured by multiple slot times.

The initiating device may initiate the CCA procedure at an end of an operating channel occupied slot time. The initiating device may initiate a deferring transmission when observing that the operating channel is not occupied for a minimum of 8 μs. The transmission deferring may span for a minimum of a random quantity of empty slot periods, where the random quantity may range from zero to a maximum quantity. The maximum quantity may not be lower than three.

The initiating device that initiates the transmission may use the operating channel for a time period, which may be referred to as a channel occupancy time (COT). In other words, the initiating device may perform the CCA procedure to initiate the COT. The COT may be less than 5 ms. After passing a CCA check based at least in part on the CCA procedure, the initiating device may share the COT with responding devices. The responding devices may not perform a CCA procedure to share the COT. A length of a time gap between initiating device transmissions and responding device transmissions may not be required to satisfy a threshold. Further, after an expiry of the COT, the initiating device may perform a new CCA procedure.

Figure 3:
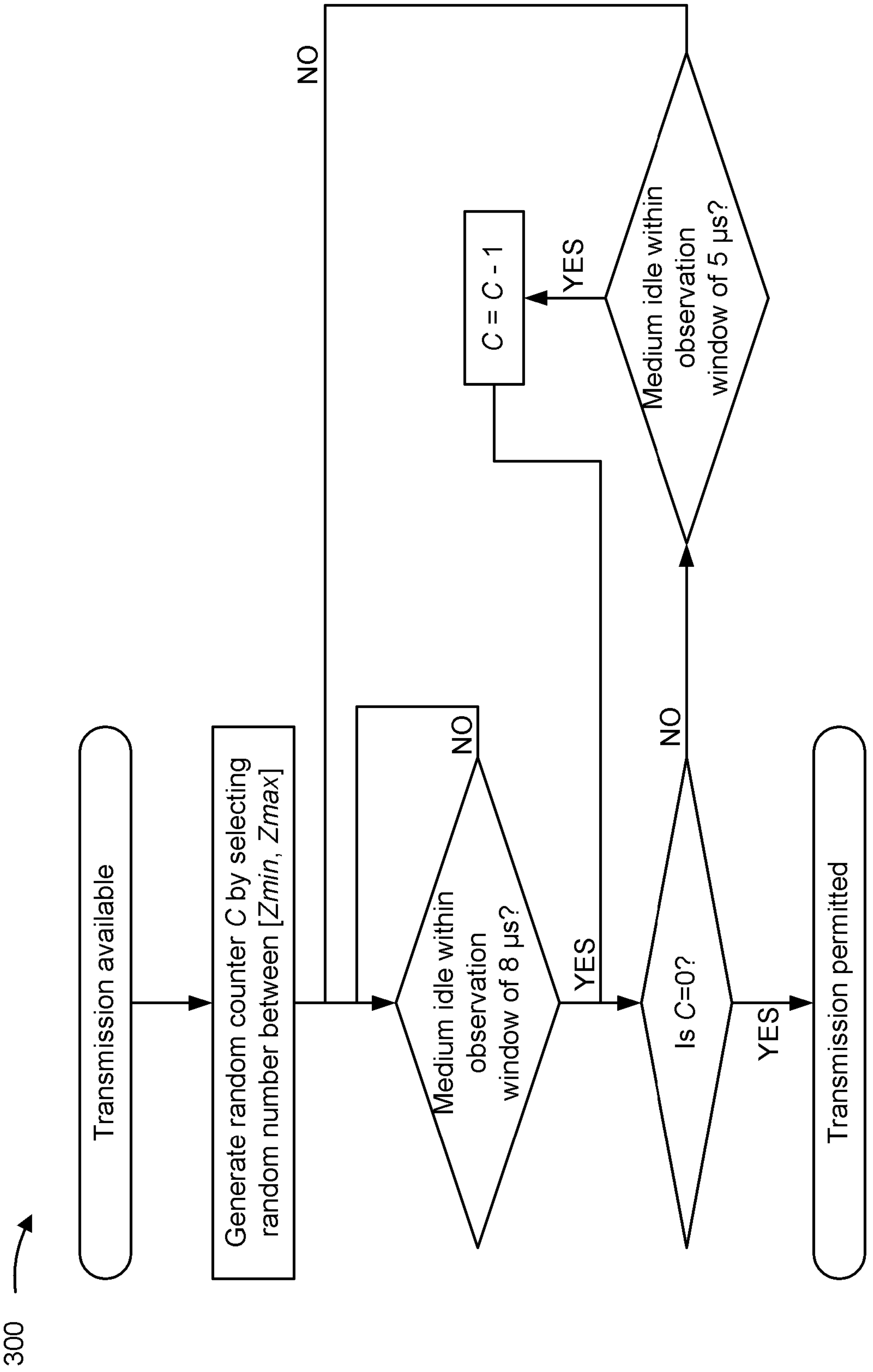
FIG. 3 is a diagram illustrating an example of a clear channel assessment (CCA) procedure, in accordance with the present disclosure.

FIG. 3 is a diagram illustrating an example 300 of a CCA procedure, in accordance with the present disclosure.

As shown in FIG. 3, when a transmission is available, an initiating device may generate a random counter C by drawing a random number between a minimum value (Zmin) and a maximum value (Zmax). The initiating device may determine whether a medium is idle within an observation window of 8 μs. When the medium is idle within the observation window of 8 μs, the initiating device may determine whether the random counter C is equal to zero. When the random counter C is equal to zero, the initiating device may be permitted to perform the transmission. When the random counter C is not equal to zero, the initiating device may determine whether the medium is idle within an observation window of 5 μs. When the medium is idle within the observation window of 5 μs, the random counter C may be equal to C−1, and the initiating device may determine again whether the random counter C is equal to zero. When the random counter C becomes equal to zero, the initiating device may be permitted to perform the transmission.

As indicated above, FIG. 3 is provided as an example. Other examples may differ from what is described with regard to FIG. 3.

In the 60 GHz band, channel access may be performed in an unlicensed spectrum. Channel access modes involving LBT and no LBT may be supported for operation in the 60 GHz band. For regions in which LBT is not mandated, both LBT and no-LBT modes of operations may coexist (e.g., LBT may be an optional feature for improved performance).

Receiver assistance may be a supported mode of operation for channel access to ensure favorable interference conditions at a desired receiver. Receiver assistance may be used prior to an uplink scheduling. A sensing from receiving TRPs to be performed prior to the uplink scheduling may be useful for the purpose of receiver assistance. A base station that shares a COT may perform a CCA (or an enhanced CCA), while other TRPs may perform the sensing for receiver assistance. An outcome of the receiver assistance sensing may impact an uplink scheduling downlink control information (DCI). The base station that is sharing the COT may perform a receiver assistance check as well based at least in part on a time division multiplexing (TDM), a spatial division multiplexing (SDM), or a beam cover. In the TDM approach, the base station that is sharing the COT may perform a receiver assistance sensing first and then perform the CCA on a Tx beam. The receiver assistance sensing may be requested to a plurality of TRPs (e.g., all TRPs) and an overall result may be accounted for in the uplink scheduling DCI. In the SDM approach, the base station that is sharing the COT may sense an Rx beam, potentially during a CCA on the Tx beam. The receiver assistance sensing may be requested to the plurality of TRPs (e.g., all TRPs) and the overall result may be accounted for in the uplink scheduling DCI. In the beam cover approach, the base station that is sharing the COT may include the Rx beam in a wide sensing beam (which may cover both the Tx beam and the Rx beam). The receiver assistance sensing may be requested to the plurality of TRPs (e.g., all TRPs) and the overall result may be accounted for in the uplink scheduling DCI. When CCA is performed at the UE, a CCA from the base station may be skipped. A downlink multi-TRP may be similar to an uplink multi-TRP, but the TRPs may determine whether to perform transmissions (e.g., all or nothing or partial transmissions) depending on a configuration and on receiver assistance information received from the UE.

For a receiver to provide receiver assistance in channel access, a channel sensing and reporting may need to be performed in accordance with a scheme. A first scheme may involve a layer 1 (L1)-RSSI based receiver assistance. A second scheme may involve a CCA/eCCA based receiver assistance with an existing physical channel/signals. A third scheme may involve a CCA/eCCA based receiver assistance with a new request to send (RTS) or clear to send (CTS) type transmission. A fourth scheme may involve a legacy layer 3 (L3)-RSSI.

In the first scheme involving the L1-RSSI based receiver assistance, a resource may be used for an RSSI measurement. The RSSI measurement may be based at least in part on time/frequency resources configured for a zero power (ZP) channel state information reference signal (CSI-RS) (ZP-CSI-RS). The ZP-CSI-RS may be associated with a plurality of resource elements in a bandwidth part (BWP) over one or more symbols. An energy measurement on an operating bandwidth may be over an indicated or specified quantity of symbols or a time interval. An L1-RSSI may be reported in an aperiodic (AP) channel state information (CSI) report. An L1-RSSI trigger may be carried in an uplink grant and/or in a downlink grant. A timeline for L1-RSSI reporting may be equal to a timeline for AP-CSI reporting. Further, a measurement beam may be indicated for the L1-RSSI, and an L1-RSSI report may include a value of RSSI measurement and/or a comparison outcome with an energy detection threshold.

In the second scheme involving the CCA/eCCA based receiver assistance with the existing physical channel/signals, in a first option, the base station may schedule/trigger an uplink physical uplink control channel (PUCCH) or sounding reference signal (SRS) transmission with a downlink assignment DCI and may indicate the CCA/eCCA in the downlink assignment DCI. The UE may perform the CCA/eCCA for the scheduled/triggered uplink transmission and if an LBT passes, the UE may transmit receiver assistance information (implicitly or explicitly) in the PUCCH (or SRS in the case of one-bit receiver assistance) to indicate an LBT outcome. The base station may detect the scheduled uplink transmission to determine whether the UE passes the CCA/eCCA. After detecting the receiver assistance information, a downlink data transmission may be performed. The downlink data transmission may be granted with a same downlink DCI that schedules/triggers a first uplink PUCCH/SRS transmission, in which case, the CCA/eCCA may be performed for at least the first uplink PUCCH/SRS transmission. In other words, the same downlink DCI that triggers the PUCCH/SRS transmission may also schedule a downlink transmission after the PUCCH/SRS transmission. The base station may not perform, based at least in part on a base station implementation, the downlink data transmission when the PUCCH/SRS is not detected, which may indicate that the CCA/eCCA fails at the UE.

In the second scheme involving the CCA/eCCA based receiver assistance with the existing physical channel/signals, in a second option, the base station may schedule/trigger an uplink transmission in a physical uplink shared channel (PUSCH) with an uplink assignment DCI and indicate the CCA/eCCA in the uplink assignment DCI. The UE may perform the CCA/eCCA for the scheduled/triggered uplink transmission and if the LBT passes, the UE may transmit receiver assistance information (implicitly or explicitly) in the PUSCH to indicate the LBT outcome. The base station may detect the scheduled uplink transmission to determine whether the UE passes the CCA/eCCA. After detecting the receiver assistance information, the downlink data transmission may be performed. The base station may not perform, based at least in part on the base station implementation, the downlink data transmission when the PUSCH is not detected, which may indicate that the CCA/eCCA fails at the UE.

In the third scheme involving the CCA/eCCA based receiver assistance with the new RTS/CTS type transmission, the base station may transmit an RTS-like signaling to the UE. The UE may perform the CCA/eCCA and if the LBT passes, the UE may transmit CTS-like signaling to explicitly indicate the LBT outcome. The base station may detect the CTS-like signaling to identify if the UE passed the CCA/eCCA. After detecting the CTS-like signaling, the downlink data transmission may be performed.

In the fourth scheme involving the legacy L3-RSSI with potential enhancements, the base station may indicate a beam used for a UE RSSI measurement, and the base station may indicate a new reference subcarrier spacing (SCS) and measurement bandwidths.

In a downlink, in a first case, the base station may obtain a COT (e.g., via an eCCA on a Tx beam), and the base station may request a short measurement (e.g., single CCA or L1-RSSI report on a UE Rx beam) and a message from the UE to enable transmitting in the downlink. In a second case, the base station may perform a short transmission to the UE without the COT (e.g., via short control signaling). The base station may request the UE to obtain the COT (e.g., via an eCCA that covers both a UE Tx beam and a desired UE Rx beam) and to respond, in order for the base station to share that COT and transmit in the downlink. In an uplink, in a first case, the base station may obtain a COT (e.g., via an eCCA that covers both a UE Tx beam and a desired UE Rx beam) and schedule the UE, where the UE may share the COT obtained by the base station. In a second case, the base station may check an Rx beam (e.g., via a CCA) and schedule the UE to transmit via short control signaling or over a preexisting COT. The UE may obtain a COT or share from a preexisting COT.

In some cases, the L3-RSSI may be extended to an unlicensed operation in FR2, which may involve introducing a radio resource control (RRC) configuration for a reference SCS, a measurement duration, and a measurement bandwidth, and which may also involve extended a reference SCS or cyclic prefix (CP) field (ref-SCS-CP-r16) and a measurement duration field (measDurationSymbols-r16) in an RSSI measurement time configuration (RMTC) configuration. A parameter in the RMTC configuration may indicate the measurement bandwidth. For a quasi co-location (QCL) Type-D of an L3-RSSI measurement, the base station may configure a beam when configuring the L3-RSSI measurement, or a QCL Type-D of a latest received physical downlink shared channel (PDSCH) and a latest monitored control resource set (CORESET) may be used.

In a multi-TRP configuration, a single DCI field "Transmission configuration Indication" (TCI) may be supported. The single DCI field "Transmission Configuration Indication" may indicate one or two TCI states associated with a code point for a single DCI based multi-TRP mechanism, or the single DCI field "Transmission Configuration Indication" may indicate only one TCI state associated with the code point for the multi-DCI based multi-TRP mechanism. An RRC configuration and medium access control control element (MAC-CE) activation/deactivation technique may be associated with the one or two TCI states.

Figure 4:
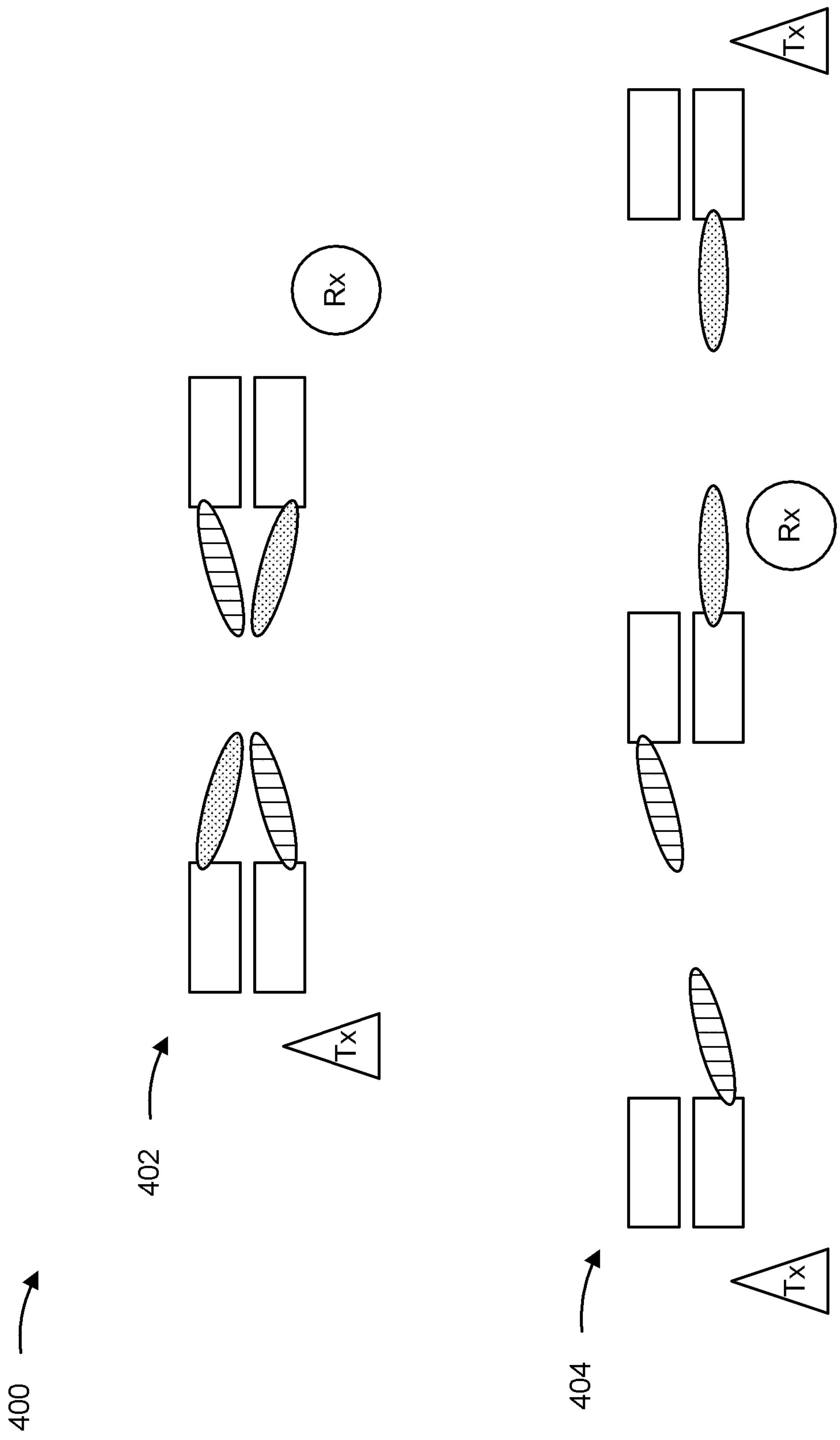
FIG. 4 is a diagram illustrating an example of multi-beam transmissions, in accordance with the present disclosure.

FIG. 4 is a diagram illustrating an example 400 of multi-beam transmissions, in accordance with the present disclosure.

In multi-beam transmissions, a beam may be associated with an antenna panel. In other words, the multi-beam transmissions may indicate a beam per antenna panel. Antenna panels may be co-located or non-co-located.

As shown by reference number 402, co-located antenna panels may be associated with a single TRP. The single TRP may use a first beam to transmit transmissions to a receiver, and the single TRP may use a second beam to receive transmissions from the receiver. The first beam may be associated with a first antenna panel and the second beam may be associated with a second antenna panel.

As shown by reference number 404, non-co-located antenna panels may be associated with a multi-TRP. The multi-TRP may include a first TRP and a second TRP. A receiver may use a first beam to receive transmissions from the first TRP, and the receiver may use a second beam to receive transmissions from the second TRP. The first beam may be associated with a first antenna panel and the second beam may be associated with a second antenna panel.

As indicated above, FIG. 4 is provided as an example. Other examples may differ from what is described with regard to FIG. 4.

For a multi-beam transmission in which each beam corresponds to a TCI state, in a 60 GHz unlicensed band, a transmitter may be unaware of beams on which transmissions are permitted for a given grant according to a channel access, receiver assistance, and/or COT sharing. The channel access may be associated with a Category 3 (Cat3) LBT (eCCA) for obtaining a COT. The receiver assistance may be associated with a Cat3 LBT for a new COT or a Category 2 (Cat2) LBT on a preexisting COT. The COT sharing may be associated with the Cat2 LBT or a Category 1 (Cat1) (no-LBT).

Further, for receiver assistance, for both downlink or uplink multi-TRP transmissions, a base station and/or UE behavior may not be defined when a receiver assistance check is not cleared at a plurality of receiving TRPs (e.g., all TRPs). In this case, the receiver assistance check may be partially cleared at only some TRPs, and the base station and/or UE behavior may not be defined when the receiver assistance check is only partially cleared at some TRPs. When receiver assistance information is available before a scheduling (e.g., an uplink scheduling or a downlink scheduling), the scheduling may be provided based at least in part on a base station behavior. However, when the receiver assistance information is not available before the scheduling or the receiver assistance information is only partially available before the scheduling, the base station and/or UE behavior may not be defined.

In various aspects of techniques and apparatuses described herein, a UE may receive, from a base station (or more than one base station) associated with two or more TRPs, scheduling information for a multi-beam communication between the UE and the base station associated with the two or more TRPs using a set of beams. The set of beams may include two or more beams. The base station may correspond to multiple physically non-co-located destinations. The base station may be associated with multiple TRPs. In some cases, more than one base station may be associated with the multiple TRPs. The multi-beam communication may be a downlink multi-beam transmission from the base station to the UE, or an uplink multi-beam transmission from the UE to the base station. The UE may perform, with the base station associated with the two or more TRPs, the multi-beam communication based at least in part on: receiver assistance information for the two or more beams in the set of beams associated with the multi-beam communication, and a policy to perform the multi-beam communication using the receiver assistance information.

In some aspects, the UE may perform a receiver assistance check based on the receiver assistance information. The UE may determine, based on the receiver assistance check, whether the one or more beams in the set of beams are associated with a success (or pass) or a failure. In other words, the receiver assistance information may indicate whether a specific beam in the set of beams is associated with a success or a failure.

In some aspects, to perform the multi-beam communication based at least in part on the policy, the UE may perform all or no communications associated with the multi-beam communication. In this case, a failure associated with a single beam in the set of beams may block an entirety of the multi-beam communication, and the failure may be indicated based at least in part on the receiver assistance information associated with the single beam. In some aspects, to perform the multi-beam communication based at least in part on the policy, the UE may perform some communications associated with the multi-beam communication based at least in part on beams in the set of beams that are not associated with failures (e.g., pass the receiver assistance check). In this case, the receiver assistance check may be based at least in part on the receiver assistance information associated with the beams in the set of beams satisfying a threshold. In other words, the beams not being associated with failures may be based at least in part on the receiver assistance information associated with the beams satisfying the threshold. In some aspects, to perform the multi-beam communication based at least in part on the policy, the UE may perform all communications associated with the multi-beam communication regardless of failures associated with the set of beams. The failures may be indicated based at least in part on the receiver assistance information associated with the set of beams. In this case, the UE may bypass the receiver assistance information for the one or more beams in the set of beams associated with the multi-beam communication. As a result, the UE may perform the multi-beam communication based at least in part on the receiver assistance information and the policy, even when the receiver assistance information becomes available after the scheduling information for the multi-beam communication.

In some aspects, the multiple TRPs may be present and the receiver assistance information may be available after the scheduling. The scheduling may be associated with a configured grant uplink (CG-UL) or a downlink/uplink scheduled in a later COT. In this case, different policies may be defined to upgrade the scheduling according to the receiver assistance information.

Figure 5:
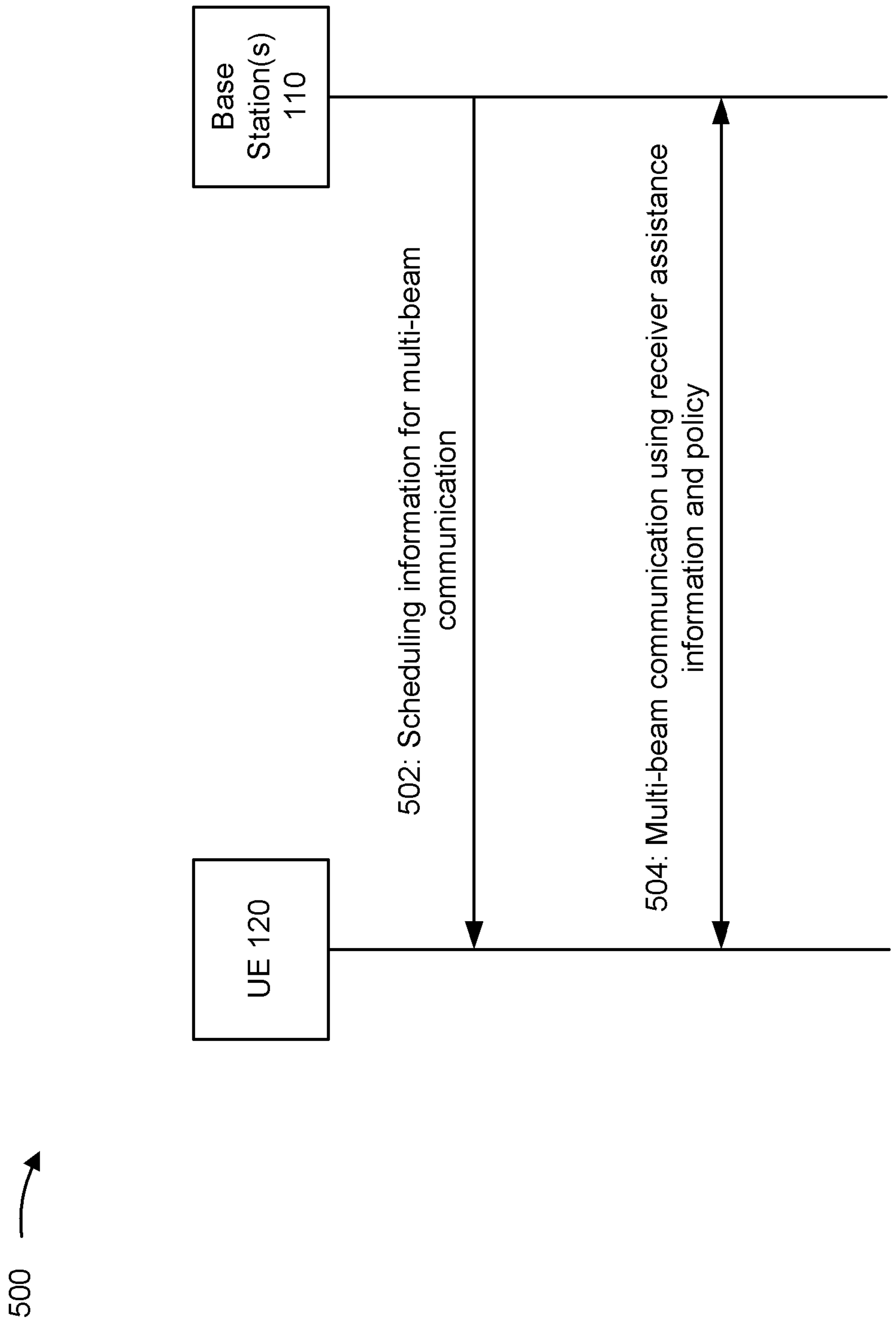
FIG. 5 is a diagram illustrating an example associated with multi-beam communications using receiver assistance information, in accordance with the present disclosure.

FIG. 5 is a diagram illustrating an example 500 associated with multi-beam communications using receiver assistance information, in accordance with the present disclosure. As shown in FIG. 5, example 500 includes communication between a UE (e.g., UE 120) and one or more base stations (e.g., base station 110). In some aspects, the UE and the one or more base stations may be included in a wireless network, such as wireless network 100.

As shown by reference number 502, the UE may receive, from the one or more base stations, scheduling information for a multi-beam communication using a set of beams between the UE and the one or more base stations. The one or more base stations may be associated with two or more TRPs. The set of beams may include one or more beams. In some aspects, the scheduling information may indicate a downlink grant and the multi-beam communication may be a downlink multi-beam transmission from the one or more base stations associated with the two or more TRPs to the UE. In some aspects, the scheduling information may indicate an uplink grant and the multi-beam communication may be an uplink multi-beam transmission from the UE to the one or more base stations associated with the two or more TRPs.

As shown by reference number 504, the UE may perform, with the one or more base stations, the multi-beam communication based at least in part on: receiver assistance information for the one or more beams in the set of beams associated with the multi-beam communication, and a policy to fulfil a grant according to the scheduling information, partially fulfil the grant according to the scheduling information, or not fulfil the grant according to the scheduling information using the receiver assistance information. In some aspects, the UE may receive, from the one or more base stations, an RRC parameter that indicates the policy. In some aspects, the UE may receive, from the one or more base stations, a DCI indication that indicates the policy. In some aspects, the policy may include fulling the grant according to the scheduling information using the receiver assistance information, the policy may include partially fulfilling the grant according to the scheduling information using the receiver assistance information, or the policy may include not fulfilling the grant according to the scheduling information using the receiver assistance information.

In some aspects, to perform the multi-beam communication based at least in part on the policy, the UE may fulfil the grant or not fulfil the grant by performing all or no communications associated with the multi-beam communication. In this case, a failure associated with a single beam in the set of beams may block an entirety of the multi-beam communication, and the failure may be indicated based at least in part on the receiver assistance information associated with the single beam. In some aspects, to perform the multi-beam communication based at least in part on the policy, the UE may partially fulfil the grant by performing some communications associated with the multi-beam communication based at least in part on beams in the set of beams that are not associated with failures. In this case, the beams not being associated with failures may be based at least in part on the receiver assistance information associated with the beams in the set of beams satisfying a threshold. In some aspects, to perform the multi-beam communication based at least in part on the policy, the UE may fulfil the grant by performing all communications associated with the multi-beam communication regardless of failures associated with the set of beams. The failures may be indicated based at least in part on the receiver assistance information associated with the set of beams. In this case, the UE may bypass the receiver assistance information for the one or more beams in the set of beams associated with the multi-beam communication. In some aspects, to perform the multi-beam communication based at least in part on the policy, the UE may fulfil the grant, partially fulfil the grant, or not fulfil the grant by performing the nmilti-beam communication based at least in part on a type of scheduling associated with the scheduling information, where the type of scheduling associated with the scheduling information may be a single DCI scheduling or a multiple DCI scheduling.

In some aspects, a lack of the receiver assistance information for a beam in the set of beams associated with the multi-beam communication may indicate that the beam is not protected and is associated with a failure. In some aspects, a beam in the set of beams may be associated with a TCI state. In some aspects, the beam in the set of beams may be associated with an SRS resource indicator (SRI).

In some aspects, the UE may receive a receiver assistance information request via a pre-grant (PG). The UE may receive the receiver assistance information request when receiving the scheduling information from the one or more base stations. The UE may perform a receiver assistance measurement (e.g., an L1-RSSI measurement) of a beam in the set of beams based at least in part on the receiver assistance information request. The UE may transmit, to the one or more base stations, an indication that the beam in the set of beams has passed a receiver assistance check based at least in part on the receiver assistance measurement satisfying a threshold.

In some aspects, the UE may receive, from the one or more base stations, the receiver assistance information. In some aspects, the UE may receive the receiver assistance information via a channel occupancy time structure information (COT-SI). The UE, to perform the multi-beam communication, may transmit, to the one or more base stations, an uplink transmission based at least in part on the COT-SI and the policy. The uplink transmission may be a configured grant PUSCH transmission or a dynamically scheduled PUSCH transmission.

In some aspects, the UE may receive the receiver assistance information via DCI (or a DCI indication). In some cases, the DCI may be invalid for a downlink scheduling. In other words, a DCI with invalid scheduling may be provided just to provide the receiver assistance information. Alternatively, a valid scheduling DCI may have a field for providing the receiver assistance information. The UE, to perform the multi-beam communication, may transmit, to the one or more base stations, an uplink transmission based at least in part on the DCI.

In some aspects, the receiver assistance information may be associated with one or more parameters. The one or more parameters may include a duration associated with the receiver assistance information, and a mode of receiver assistance corresponding to the policy. In some aspects, the UE may receive, from the one or more base stations, the receiver assistance information via a synchronization signal block (SSB) sweep on the set of beams, where a downlink channel associated with each SSB of the SSB sweep may indicate a flag for the receiver assistance information associated with a beam in the set of beams.

As indicated above, FIG. 5 is provided as an example. Other examples may differ from what is described with regard to FIG. 5.

In some aspects, a base station (or multiple base stations) associated with multiple TRPs may schedule a multi-beam transmission for a UE. The multi-beam transmission may be performed by the UE in an uplink. Alternatively, the multi-beam transmission may be performed by the base station in a downlink. The multi-beam transmission may be associated with scheduled TCIs. A scheduling of the multi-beam transmission may occur prior to receiver assistance information (e.g., before the receiver assistance information is received at the UE or at the base station). The UE (or base station) may check for a presence of receiver assistance information for the scheduled TCIs. The UE (or base station) may determine that the receiver assistance information has become available after the scheduling of the multi-beam transmission but prior to the multi-beam transmission itself. The UE (or base station) may upgrade the scheduled multi-beam transmission according to the available receiver assistance information (per beam). In other words, the UE (or base station) may perform the multi-beam transmission depending on the available receiver assistance information and based at least in part on a policy, where the policy may be defined for a multi-TRP with receiver assistance.

In some aspects, in a first behavior, the UE (or base station) may transmit all or none of the transmissions associated with the scheduled multi-beam transmission in accordance with the policy, such that a single failure associated with any receiver assistance information on any beam may block the entire scheduled multi-beam transmission. In some aspects, in a second behavior, the UE (or base station) may transmit some of the transmissions (partial transmissions) associated with the scheduled multi-beam transmission in accordance with the policy. In this case, the UE (or base station) may transmit only on beams for which a receiver assistance check is cleared at receiving TRPs (or at the UE), as indicated by the receiver assistance information. In this case, the UE (or base station) may transmit only for TCI states that have cleared the receiver assistance check, as indicated by the receiver assistance information. In some aspects, in a third behavior, the UE (or base station) may transmit all of the transmissions associated with the scheduled multi-beam transmission in accordance with the policy, regardless of a failure associated with any receiver assistance information on any beam. The failures may be indicated based at least in part on the receiver assistance information associated with the set of beams. In this case, the UE (or base station) may bypass the receiver assistance information and transmit all of the transmissions anyway. As a result, the UE (or base station) may perform one of three possible behaviors (e.g., transmit all anyway, transmit all or nothing, or partially transmit) for the scheduled multi-beam transmission.

In some aspects, uplink receiver assistance information to the UE may be refreshed under a semi-persistent scheduling (SPS). The uplink receiver assistance information to the UE may be based at least in part on a receiver assistance DCI, a receiver assistance COT-SI, or a receiver assistance SSB sweep.

In some aspects, when the UE and the base station operate using receiver assistance information, not receiving the receiver assistance information before a scheduled transmission associated with a beam may indicate that the beam is not protected. In other words, the beam may be considered a failure since the receiver assistance information has not been received for that beam. The beam may be included in a set of beams that are associated with the multi-beam transmission. In some aspects, the beams may be indicated based at least in part on a TCI state associated with each of the beams. In other words, the receiver assistance information may be referred to via a corresponding TCI state. In some aspects, the beams may be indicated based at least in part on an SRI associated with each of the beams. In other words, the receiver assistance information may be referred to via a corresponding SRI.

In some aspects, behaviors of the UE (e.g., transmit all anyway, transmit all or nothing, or partially transmit) for the scheduled multi-beam transmission may be controlled via an RRC parameter or via a DCI indication. For example, the base station may transmit the RRC parameter or the DCI indication to the UE, which may indicate to the UE to perform one of three possible behaviors for the scheduled multi-beam transmission. In some aspects, the behaviors of the UE (e.g., transmit all anyway, transmit all or nothing, or partially transmit) for the scheduled multi-beam transmission may be controlled (implicitly) depending on a type of scheduling (e.g., single DCI scheduling or multiple DCI scheduling). When the scheduling is for different layers of either a PUSCH or a PDSCH corresponding to a single transport block, then the third behavior associated with partial transmissions may be disabled. An indication of partial transmissions may be upgraded automatically to either the first behavior (e.g., transmit all anyway) or the second behavior (e.g., transmit all or nothing). In some aspects, a multi-TRP transmission may be associated with single DCI scheduling or multi-DCI scheduling. In case of a multi-TRP transmission for a single transport block, a reception for the multi-TRP transmission may be with a single discrete Fourier transform (DFT), so the multi-TRP transmission may be tightly aligned in time.

As an example, the base station may signal an RRC parameter to the UE indicating that the UE should follow the second behavior (e.g., transmit all or nothing). The base station may provide the UE with a downlink grant with a receiver assistance request. The UE may perform a receiver assistance measurement (e.g., based at least in part on an L1-RSSI), and report TCIs that have passed a receiver assistance check. The base station and the UE may determine that scheduling will not be fulfilled if the receiver assistance measurement fails due to the second behavior implemented at the UE, which may save resources and energy for both the base station and the UE.

As another example, the base station may signal an RRC parameter to the UE indicating that the UE should follow the third behavior (e.g., partial transmissions). The base station may provide the UE with a downlink grant with a receiver assistance request. The UE may perform a receiver assistance measurement and report TCIs that have passed a receiver assistance check. The base station and the UE may determine that, among TCI states indicated in a scheduling, communications may occur only on the TCI states for which a receiver assistance measurement was successful (e.g., passed a receiver assistance check), which may save resources and energy for both the base station and the UE.

As yet another example, the base station may signal an RRC parameter to the UE indicating that the UE should follow the second behavior (e.g., transmit all or nothing). The base station may provide the UE with a downlink grant without a receiver assistance request. The base station may later send the UE the receiver assistance request. The UE may fail in receiving the receiver assistance request, and the UE may neither collect nor deliver receiver assistance information to the base station. An absence of the receiver assistance information may correspond to a failure, and both the base station and the UE may determine that a scheduling will not be fulfilled due to the failure and based at least in part on the second behavior implemented at the UE, which may save resources and energy for both the base station and the UE.

Figure 6:
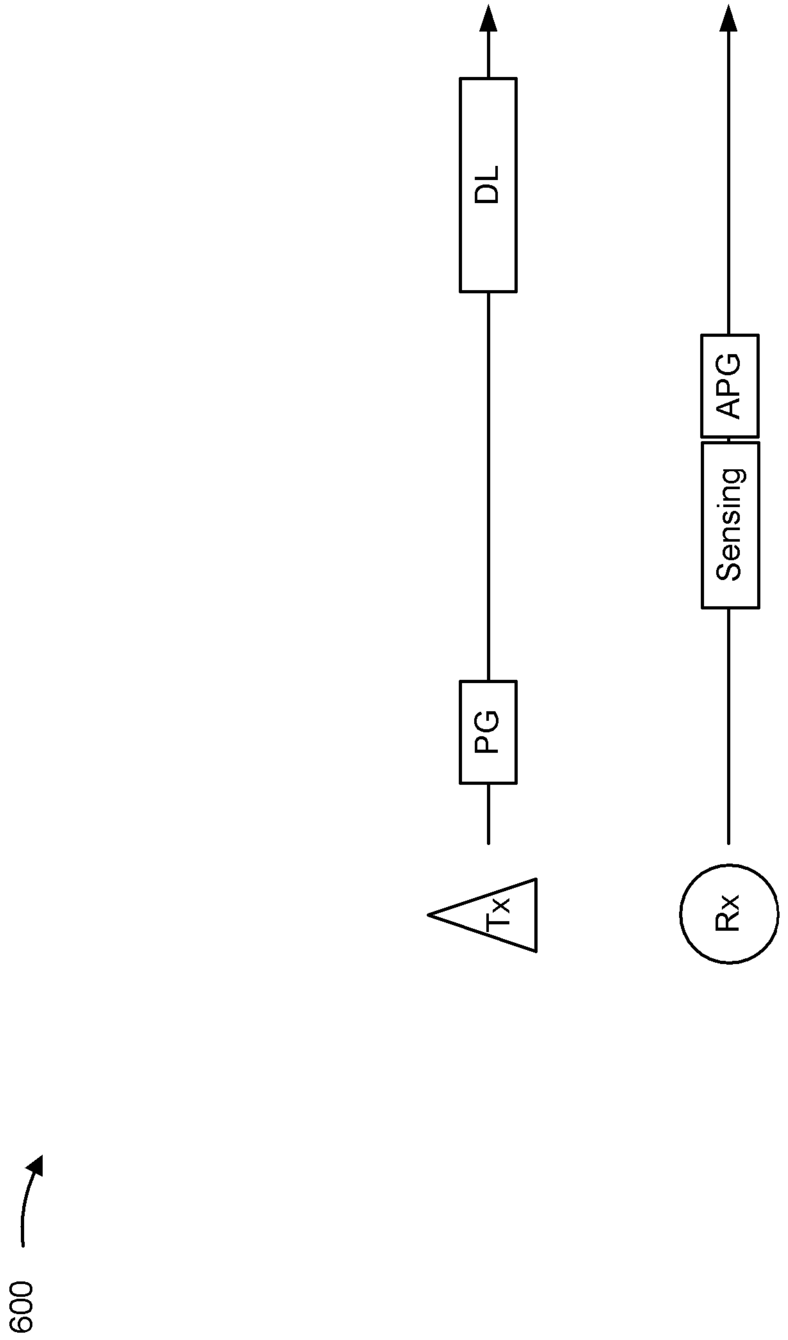
FIG. 6 is a diagram illustrating an example associated with providing receiver assistance information for a downlink, in accordance with the present disclosure.

FIG. 6 is a diagram illustrating an example 600 associated with providing receiver assistance information for a downlink, in accordance with the present disclosure.

As shown in FIG. 6, when providing the receiver assistance information for the downlink, a transmitter (e.g., a base station) may transmit a pre-grant (PG) to a receiver (e.g., a UE). The PG may indicate a request for receiver assistance information via a DCI. The receiver may perform a sensing based at least in part on the PG. The receiver may transmit, to the transmitter, an acknowledgement to the PG (APG) via a PUSCH, a PUCCH, or an SRS, where the APG may indicate the receiver assistance information. The transmitter may perform a new downlink scheduling or fulfill a previously provided downlink scheduling based at least in part on the APG.

As indicated above, FIG. 6 is provided as an example. Other examples may differ from what is described with regard to FIG. 6.

In some aspects, when receiver assistance for an uplink is performed closely to a scheduled uplink, receiver side measurements at the base station may be used to perform an uplink scheduling decision. For a CG-PUSCH, an uplink receiver assistance information refresh before an uplink transmission may be useful. For a dynamic uplink grant, a scheduling DCI may be transmitted relatively long before a scheduled uplink time. The uplink receiver assistance information refresh for multi-beam uplink transmissions may be used to modify an interpretation of the CG-PUSCH or the dynamic uplink grant.

Figure 7:
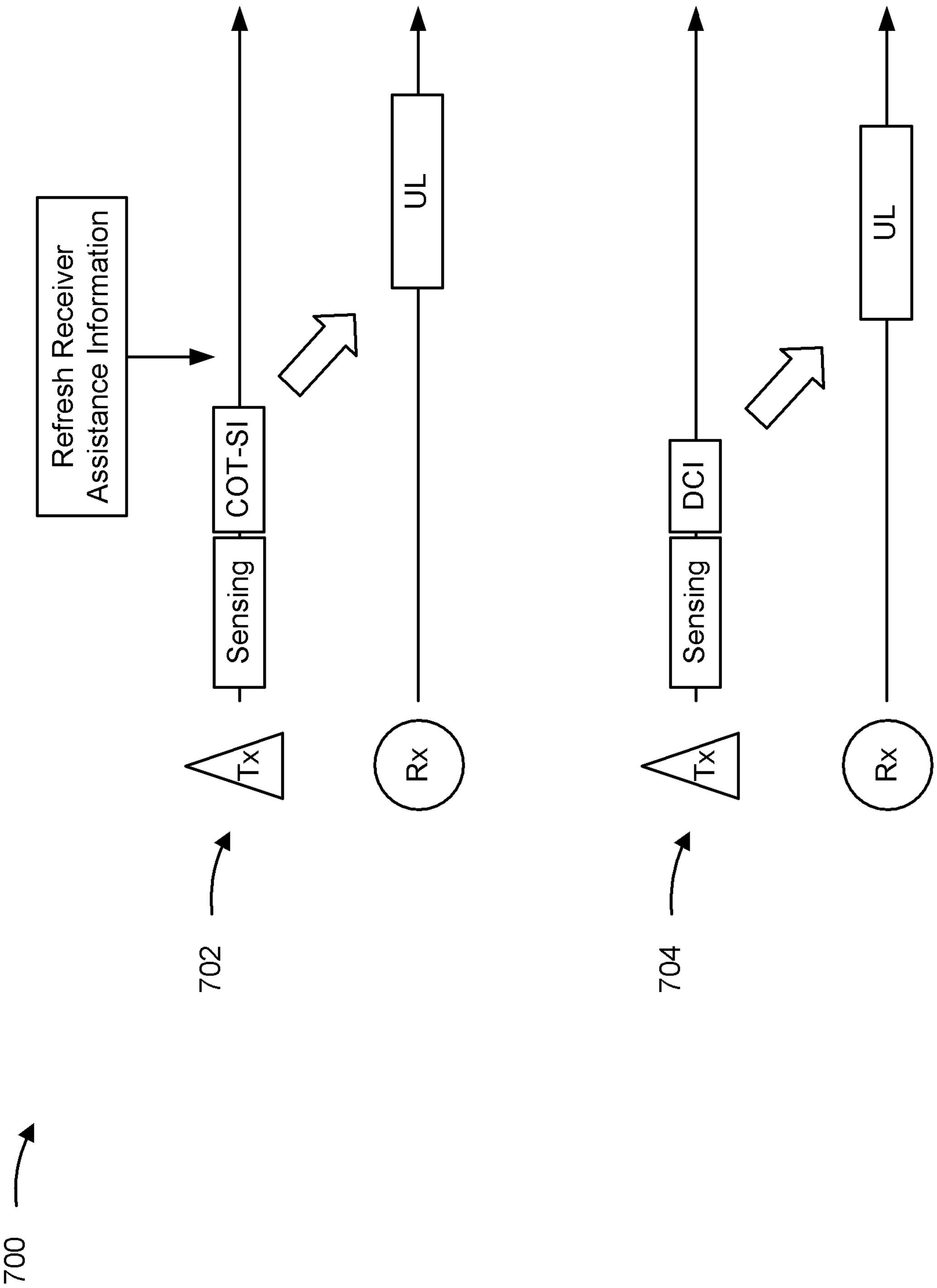
FIG. 7 is a diagram illustrating an example associated with providing receiver assistance information for an uplink, in accordance with the present disclosure.

FIG. 7 is a diagram illustrating an example 700 associated with providing receiver assistance information for an uplink, in accordance with the present disclosure.

As shown by reference number 702, a transmitter (e.g., a base station) may perform a sensing and transmit a COT-SI to a receiver (e.g., a UE). The transmitter may refresh uplink receiver assistance information to the receiver using a receiver assistance COT-SI. The receiver may use the COT-SI to obtain uplink receiver assistance information. The receiver may perform an uplink transmission based at least in part on the COT-SI that indicates the uplink receiver assistance information. The uplink transmission may be a CG-PUSCH or a dynamically scheduled PUSCH.

In some aspects, the COT-SI may refer to a TCI state over which the COT is obtained. When the TCI state corresponding to an uplink scheduling is present in per-beam COT information, the beam corresponding to that TCI state may be protected. In some aspects, when the COT-SI does not have a beam indication, the UE may use a QCL relation with a physical downlink control channel (PDCCH) over which the COT-SI is transmitted to determine whether the beam is protected.

As shown by reference number 704, a transmitter (e.g., a base station) may perform a sensing and transmit a DCI to a receiver (e.g., a UE). The DCI may be associated with an invalid downlink scheduling DCI, and the DCI may be used to convey the uplink receiver assistance information. The transmitter may refresh uplink receiver assistance information to the receiver using the DCI, which may be considered to be a receiver assistance DCI. The DCI may be used to signal receiver protection of certain TCIs (or certain beams). The DCI may provide an invalid scheduling based at least in part on a combination of a valid time domain resource allocation (TDRA), a frequency domain resource allocation (FDRA), and/or an MCS. The receiver may perform an uplink transmission based at least in part on the DCI that indicates the uplink receiver assistance information. The uplink transmission may be a CG-PUSCH or a dynamically scheduled PUSCH.

As indicated above, FIG. 7 is provided as an example. Other examples may differ from what is described with regard to FIG. 7.

In some aspects, the base station or the UE may maintain an RRC configuration with parameters related to receiver assistance information. The parameters may include a duration of receiver assistance (durationOfRxAssistance) parameter, which may indicate a duration of a received receiver assistance information. The duration may correspond to a quantity of symbols or a quantity of slots. The parameters may include a mode of receiver assistance (modeOfRxAssistance), which may indicate whether a first behavior (e.g., transmit all anyway), a second behavior (e.g., transmit all or nothing), or a third behavior (e.g., partially transmit) should be followed.

Figure 8:
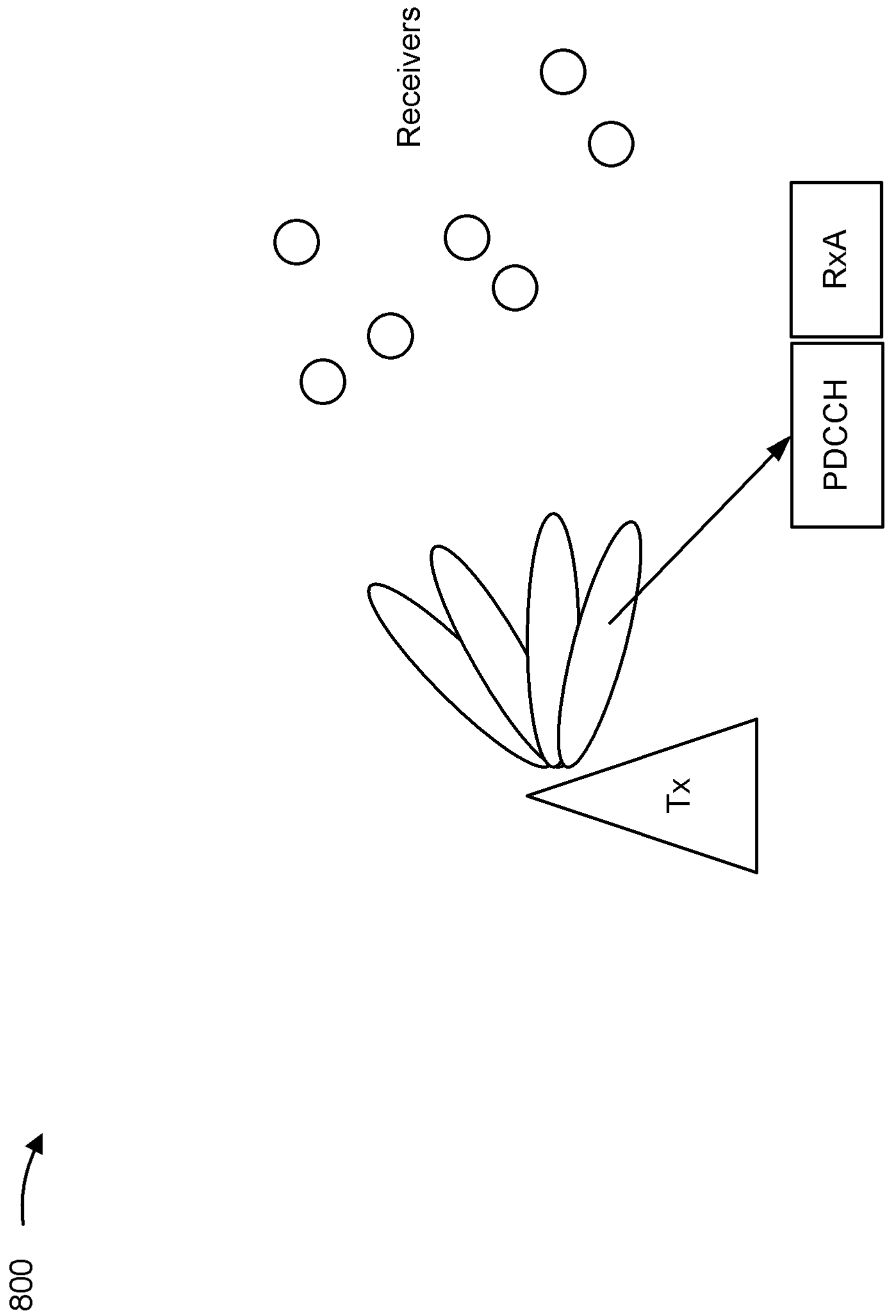
FIG. 8 is a diagram illustrating an example associated with disseminating receiver assistance information from a base station, in accordance with the present disclosure.

FIG. 8 is a diagram illustrating an example 800 associated with disseminating receiver assistance information from a base station, in accordance with the present disclosure.

In some aspects, the base station may have several UEs with an activated CG-PUSCH. When receiver assistance information is needed for those CG-PUSCHs, an efficient dissemination from the base station may be needed.

As shown in FIG. 8, the base station may use an SSB sweep to disseminate receiver assistance information on different beams. In other words, the base station may refresh uplink receiver assistance information to the UEs using a receiver assistance SSB sweep. The base station may perform a receiver assistance measurement before the SSB sweep, and the base station may determine a receiver protection of an SSB beam using the receiver assistance measurement. A PDCCH type 0 carrying an SSB may have a flag for the receiver assistance information related to that beam (e.g., a codepoint value may indicate a presence/absence of receiver protection). TCI state information may be based at least in part on a QCL relation from the SSB sweep.

In some aspects, a duration of the receiver protection may be based at least in part on an RRC parameter. For example, the duration of the receiver protection may be a period of the SSB sweep.

As indicated above, FIG. 8 is provided as an example. Other examples may differ from what is described with regard to FIG. 8.

Figure 9:
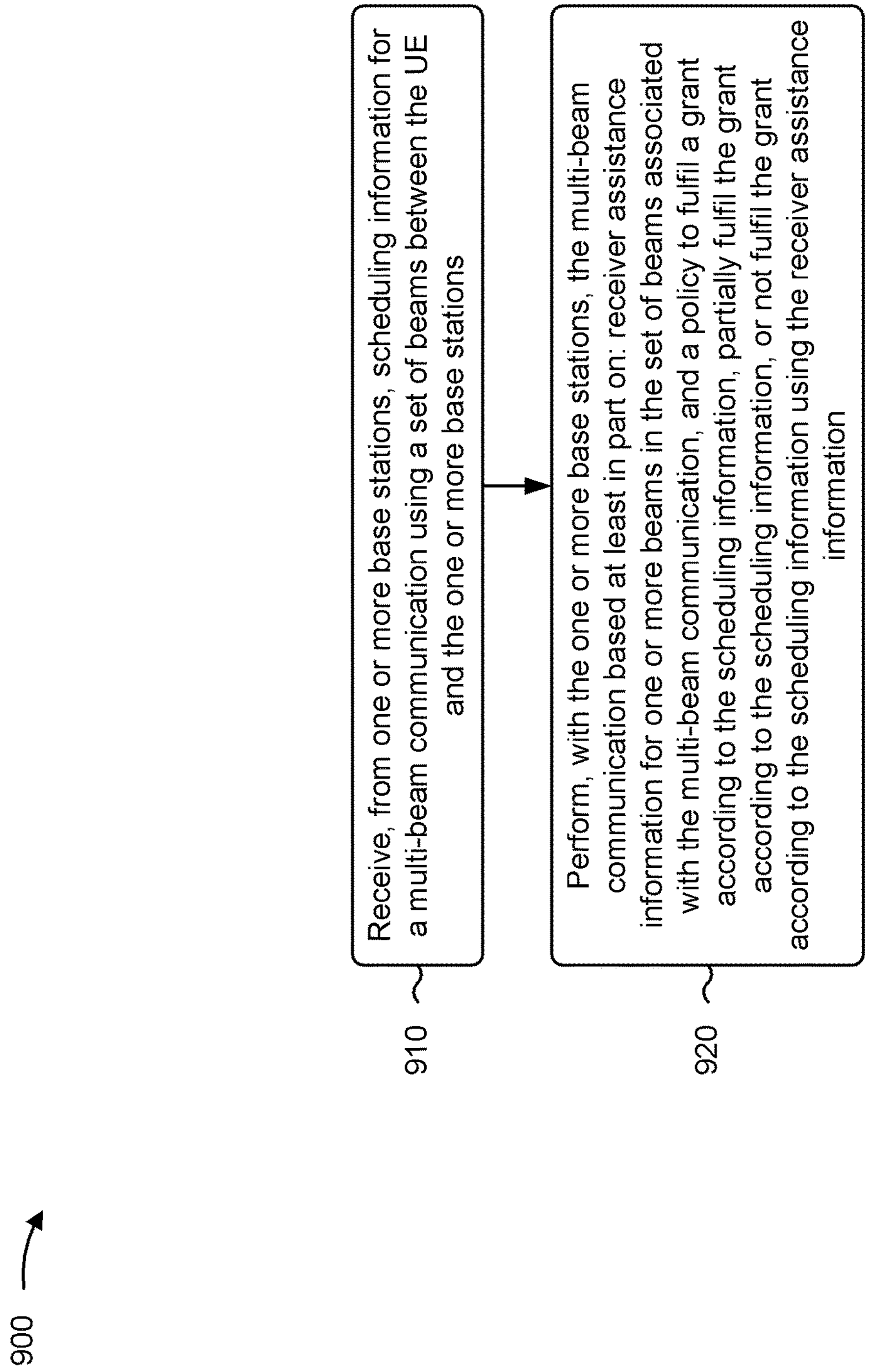
FIGS. 9-10 are diagrams illustrating example processes associated with multi-beam communications using receiver assistance information, in accordance with the present disclosure.

FIG. 9 is a diagram illustrating an example process 900 performed, for example, by a UE, in accordance with the present disclosure. Example process 900 is an example where the UE (e.g., UE 120) performs operations associated with multi-beam communications using receiver assistance information.

As shown in FIG. 9, in some aspects, process 900 may include receiving, from one or more base stations, scheduling information for a multi-beam communication using a set of beams between the UE and the one or more base stations (block 910). For example, the UE (e.g., using reception component 1102, depicted in FIG. 11) may receive, from one or more base stations, scheduling information for a multi-beam communication using a set of beams between the UE and the one or more base stations, as described above, for example, with reference to FIGS. 5-8.

As further shown in FIG. 9, in some aspects, process 900 may include performing, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information (block 920). For example, the UE (e.g., using reception component 1102 or transmission component 1104, depicted in FIG. 11) may perform, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information, as described above, for example, with reference to FIGS. 5-8.

Process 900 may include additional aspects, such as any single aspect or any combination of aspects described below and/or in connection with one or more other processes described elsewhere herein.

In a first aspect, process 900 includes fulfilling the grant or not fulfilling the grant by performing all or no communications associated with the multi-beam communication, wherein a failure associated with a single beam in the set of beams blocks an entirety of the multi-beam communication, and the failure is indicated based at least in part on the receiver assistance information associated with the single beam.

In a second aspect, process 900 includes partially fulfilling the grant by performing some communications associated with the multi-beam communication based at least in part on beams in the set of beams that are not associated with failures, wherein the beams not being associated with failures is based at least in part on the receiver assistance information associated with the beams satisfying a threshold.

In a third aspect, process 900 includes fulfilling the grant by performing all communications associated with the multi-beam communication regardless of failures associated with the set of beams, wherein the failures are indicated based at least in part on the receiver assistance information associated with the set of beams.

In a fourth aspect, a lack of the receiver assistance information for a beam in the set of beams associated with the multi-beam communication indicates that the beam is not protected and is associated with a failure.

In a fifth aspect, a beam in the set of beams is associated with a TC state or an SRI. Additionally or alternatively, each beam in the set of beams is associated with a TCI state or an SRI. The TCI state or SRI of at least one beam in the set of beams is different from the TCI state or SRI of at least one other beam in the set of beams.

In a sixth aspect, process 900 includes receiving, from the one or more base stations, an RRC parameter that indicates the policy.

In a seventh aspect, process 900 includes receiving, from the one or more base stations, a DCI indication that indicates the policy.

In an eighth aspect, process 900 includes fulfilling the grant, partially fulfilling the grant, or not fulfilling the grant by performing the multi-beam communication based at least in part on a type of scheduling associated with the scheduling information, wherein the type of scheduling associated with the scheduling information is a single DCI scheduling or a multiple DCI scheduling.

In a ninth aspect, process 900 includes the scheduling information indicates a downlink grant and the multi-beam communication is a downlink multi-beam transmission from the one or more base stations to the UE, or the scheduling information indicates an uplink grant and the multi-beam communication is an uplink multi-beam transmission from the UE to the one or more base stations.

In a tenth aspect, process 900 includes receiving a receiver assistance information request via a pre-grant; performing a receiver assistance measurement of a beam in the set of beams based at least in part on the receiver assistance information request, and transmitting, to the one or more base stations, an indication that the beam in the set of beams has passed a receiver assistance check based at least in part on the receiver assistance measurement satisfying a threshold.

In an eleventh aspect, process 900 includes receiving, from the one or more base stations, the receiver assistance information; and transmitting, to the one or more base stations, an uplink transmission based at least in part on the receiver assistance information and the policy.

In a twelfth aspect, process 900 includes receiving the receiver assistance information via a COT-SI or a DCI indication, wherein the uplink transmission is transmitted based at least in part on the COT-SI or the DCI indication.

In a thirteenth aspect, the receiver assistance information is associated with one or more parameters.

In a fourteenth aspect, the one or more parameters include a duration associated with the receiver assistance information, and a mode of receiver assistance corresponding to the policy.

In a fifteenth aspect, process 900 includes receiving, from the one or more base stations, the receiver assistance information via an SSB sweep on the set of beams, wherein a downlink channel associated with each SSB of the SSB sweep indicates a flag for the receiver assistance information associated with that beam in the set of beams.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
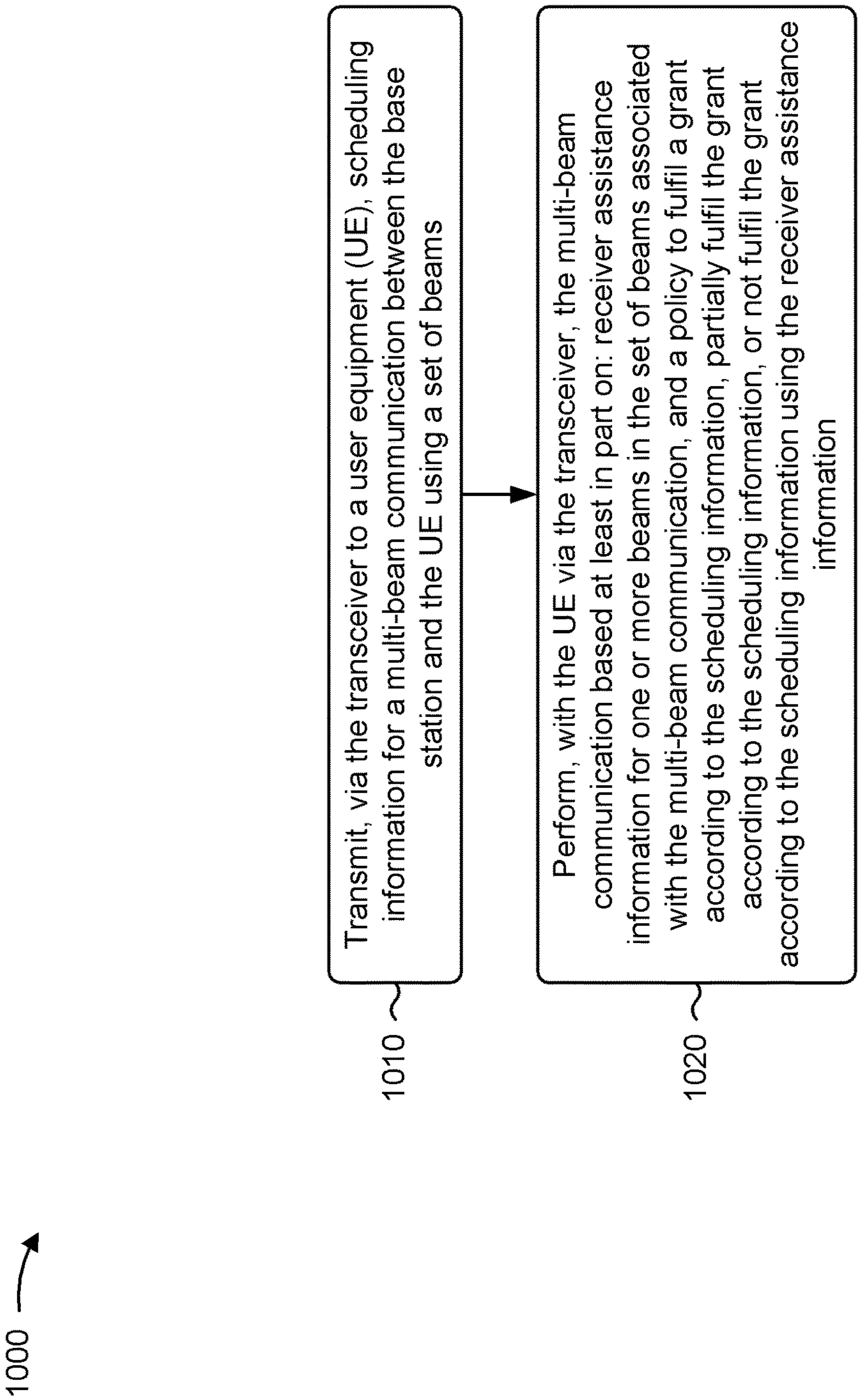

FIG. 10 is a diagram illustrating an example process 1000 performed, for example, by a base station, in accordance with the present disclosure. Example process 1000 is an example where the base station (e.g., base station 110) performs operations associated with multi-beam communications using receiver assistance information.

As shown in FIG. 10, in some aspects, process 1000 may include transmitting, to a UE, scheduling information for a multi-beam communication between the base station and the UE using a set of beams (block 1010). For example, the base station (e.g., using transmission component 1204, depicted in FIG. 12) may transmit, to a UE, scheduling information for a multi-beam communication between the base station and the UE using a set of beams, as described above, for example, with reference to FIGS. 5-8.

As further shown in FIG. 10, in some aspects, process 1000 may include performing, with the UE, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information (block 1020). For example, the base station (e.g., using reception component 1202 or transmission component 1204, depicted in FIG. 12) may perform, with the UE, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information, as described above, for example, with reference to FIGS. 5-8.

Process 1000 may include additional aspects, such as any single aspect or any combination of aspects described below and/or in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
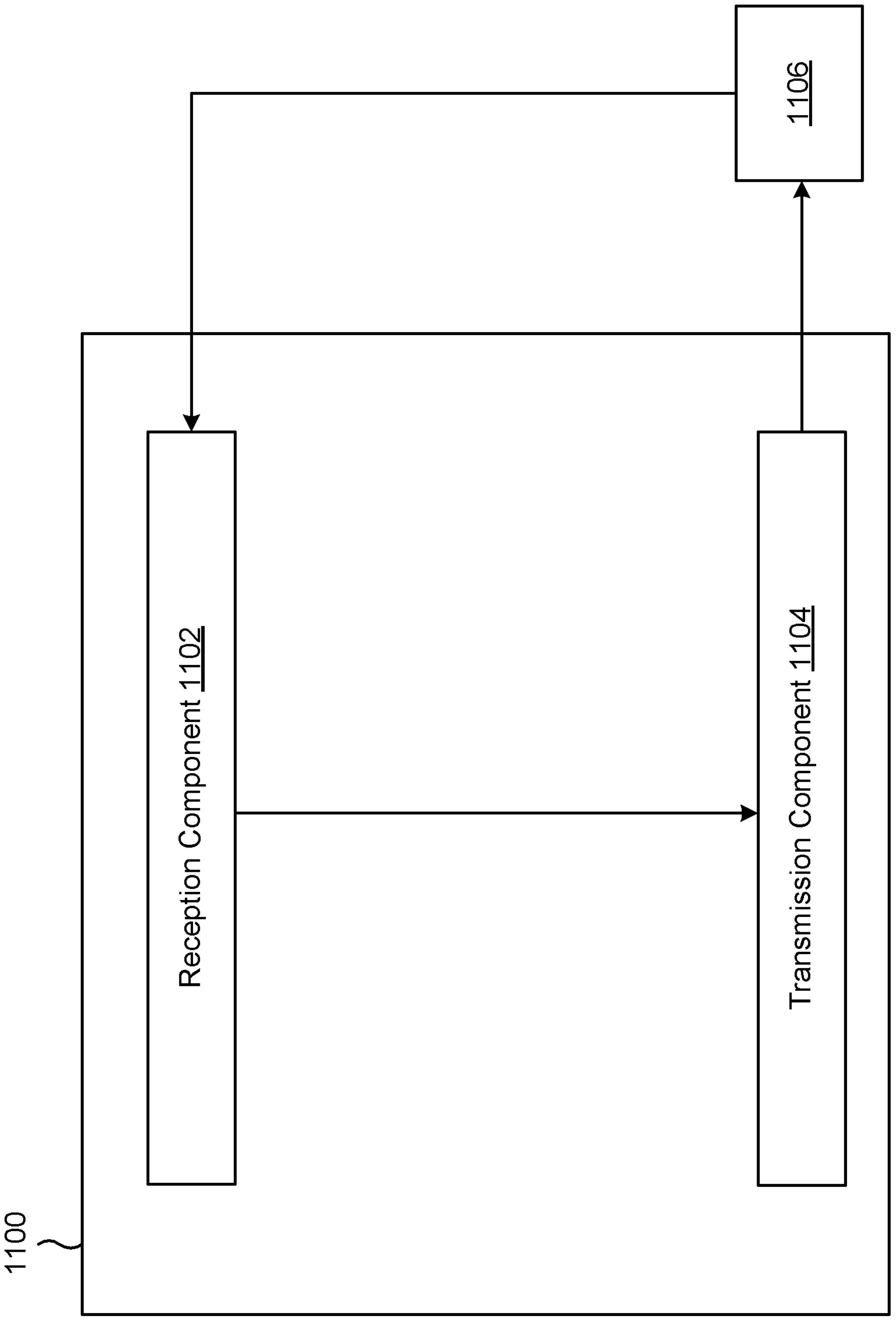
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, abase station, or another wireless communication device) using the reception component 1102 and the transmission component 1104.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from one or more base stations, scheduling information for a multi-beam communication using a set of beams between the UE and the one or more base stations. The reception component 1102 or the transmission component 1104 may perform, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
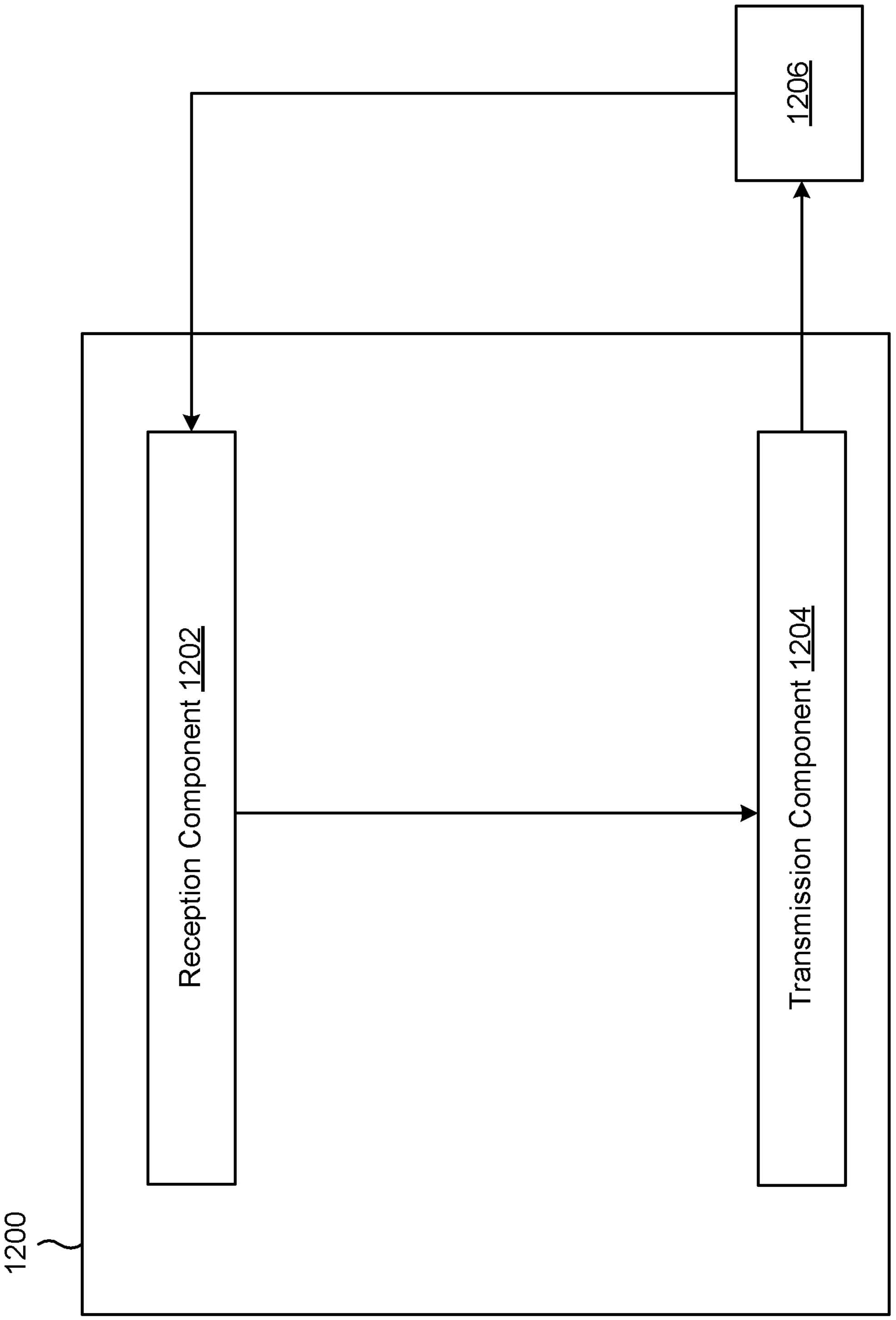

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 5-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit, to a UE, scheduling information for a multi-beam communication between the base station and the UE using a set of beams. The reception component 1202 or the transmission component 1204 may perform, with the UE, the multi-beam communication based at least in part on: receiver assistance information for the one or more beams in the set of beams associated with the multi-beam communication, and a policy for fulfilling a grant according to the scheduling information, partially fulfilling the grant according to the scheduling information, or not fulfilling the grant according to the scheduling information using the receiver assistance information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from one or more base stations, scheduling information for a multi-beam communication using a set of beams between the UE and the one or more base stations; and performing, with the one or more base stations, the multi-beam communication based at least in part on: receiver assistance information for one or more beams in the set of beams associated with the multi-beam communication, and a policy to fulfil a grant according to the scheduling information, partially fulfil the grant according to the scheduling information, or not fulfil the grant according to the scheduling information using the receiver assistance information.

Aspect 2: The method of Aspect 1, wherein performing the multi-beam communication based at least in part on the policy comprises: fulfilling the grant or not fulfilling the grant by performing all or no communications associated with the multi-beam communication, wherein a failure associated with a single beam in the set of beams blocks an entirety of the multi-beam communication, and wherein the failure is indicated based at least in part on the receiver assistance information associated with the single beam.

Aspect 3: The method of any of Aspects 1 through 2, wherein performing the multi-beam communication based at least in part on the policy comprises: partially fulfilling the grant by performing some communications associated with the multi-beam communication based at least in part on beams in the set of beams that are not associated with failures, wherein the beams not being associated with failures is based at least in part on the receiver assistance information associated with the beams satisfying a threshold.

Aspect 4: The method of any of Aspects 1 through 3, wherein performing the multi-beam communication based at least in part on the policy comprises: fulfilling the grant by performing all communications associated with the multi-beam communication regardless of failures associated with the set of beams, wherein the failures are indicated based at least in part on the receiver assistance information associated with the set of beams.

Aspect 5: The method of any of Aspects 1 through 4, wherein a lack of the receiver assistance information for a beam in the set of beams associated with the multi-beam communication indicates that the beam is not protected and is associated with a failure.

Aspect 6: The method of any of Aspects 1 through 5, wherein abeam in the set of beams is associated with a transmission configuration indicator state or a sounding reference signal resource indicator.

Aspect 7: The method of any of Aspects 1 through 6, further comprising: receiving, from the one or more base stations, a radio resource control parameter that indicates the policy.

Aspect 8: The method of any of Aspects 1 through 7, further comprising: receiving, from the one or more base stations, a downlink control information indication that indicates the policy.

Aspect 9: The method of any of Aspects 1 through 8, wherein performing the multi-beam communication based at least in part on the policy comprises fulfilling the grant, partially fulfilling the grant, or not fulfilling the grant by performing the multi-beam communication based at least in part on a type of scheduling associated with the scheduling information, wherein the type of scheduling associated with the scheduling information is a single downlink control information (DCI) scheduling or a multiple DCI scheduling.

Aspect 10: The method of any of Aspects 1 through 9, wherein: the scheduling information indicates a downlink grant and the multi-beam communication is a downlink multi-beam transmission from the one or more base stations to the UE; or the scheduling information indicates an uplink grant and the multi-beam communication is an uplink multi-beam transmission from the UE to the one or more base stations.

Aspect 11: The method of any of Aspects 1 through 10, wherein: receiving the scheduling information comprises receiving a receiver assistance information request via a pre-grant, and further comprising: performing a receiver assistance measurement of a beam in the set of beams based at least in part on the receiver assistance information request; and transmitting, to the one or more base stations, an indication that the beam in the set of beams has passed a receiver assistance check based at least in part on the receiver assistance measurement satisfying a threshold.

Aspect 12: The method of any of Aspects 1 through 11, further comprising: receiving, from the one or more base stations, the receiver assistance information, and wherein performing the multi-beam communication comprises transmitting, to the one or more base stations, an uplink transmission based at least in part on the receiver assistance information.

Aspect 13: The method of any of Aspects 1 through 12, wherein receiving the receiver assistance information comprises receiving the receiver assistance information via a channel occupancy time structure information (COT-SI) or a downlink control information (DCI) indication, wherein the uplink transmission is transmitted based at least in part on the COT-SI or the DCI indication.

Aspect 14: The method of any of Aspects 1 through 13, wherein the receiver assistance information is associated with one or more parameters.

Aspect 15: The method of any of Aspects 1 through 14, wherein the one or more parameters include: a duration associated with the receiver assistance information, and a mode of receiver assistance corresponding to the policy.

Aspect 16: The method of any of Aspects 1 through 15, further comprising: receiving, from the one or more base stations, the receiver assistance information via a synchronization signal block (SSB) sweep on the set of beams, wherein a downlink channel associated with each SSB of the SSB sweep indicates a flag for the receiver assistance information associated with that beam in the set of beams.

Aspect 17: A method of wireless communication performed by abase station, comprising: transmitting, to a user equipment (UE), scheduling information for a multi-beam communication between the base station and the UE using a set of beams; and performing, with the UE, the multi-beam communication based at least in part on: receiver assistance information for the one or more beams in the set of beams associated with the multi-beam communication, and a policy for fulfilling a grant according to the scheduling information, partially fulfilling the grant according to the scheduling information, or not fulfilling the grant according to the scheduling information using the receiver assistance information.

Aspect 18: An apparatus for wireless communication at a device, comprising a processor, memory coupled with the processor, and instructions stored in the memory and executable by the processor to cause the apparatus to perform the method of one or more of Aspects 1-16.

Aspect 19: A device for wireless communication, comprising a memory and one or more processors coupled to the memory, the one or more processors configured to perform the method of one or more of Aspects 1-16.

Aspect 20: An apparatus for wireless communication, comprising at least one means for performing the method of one or more of Aspects 1-16.

Aspect 21: A non-transitory computer-readable medium storing code for wireless communication, the code comprising instructions executable by a processor to perform the method of one or more of Aspects 1-16.

Aspect 22: A non-transitory computer-readable medium storing a set of instructions for wireless communication, the set of instructions comprising one or more instructions that, when executed by one or more processors of a device, cause the device to perform the method of one or more of Aspects 1-16.

Aspect 23: An apparatus for wireless communication at a device, comprising a processor, memory coupled with the processor, and instructions stored in the memory and executable by the processor to cause the apparatus to perform the method of Aspect 17.

Aspect 24: A device for wireless communication, comprising a memory and one or more processors coupled to the memory, the one or more processors configured to perform the method of Aspect 17.

Aspect 25: An apparatus for wireless communication, comprising at least one means for performing the method of Aspect 17.

Aspect 26: A non-transitory computer-readable medium storing code for wireless communication, the code comprising instructions executable by a processor to perform the method of Aspect 17.

Aspect 27: A non-transitory computer-readable medium storing a set of instructions for wireless communication, the set of instructions comprising one or more instructions that, when executed by one or more processors of a device, cause the device to perform the method of Aspect 17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:

one or more antennas; and a processing system, coupled with the one or more antennas, that includes one or more processors and a memory that stores code for the one or more processors, the processing system configured to:

receive, via the one or more antennas from one or more base stations, scheduling information for a multi-beam communication using a set of beams between the UE and the one or more base stations;

receive, via the one or more antennas from the one or more base stations, receiver assistance information for the set of beams via a synchronization signal block (SSB) sweep on the set of beams; and perform, with the one or more base stations via the one or more antennas, the multi-beam communication based at least in part on:

the receiver assistance information, and a policy to fulfil a grant, partially fulfil the grant, or not fulfil the grant, according to the scheduling information using the receiver assistance information.

2. The UE of claim 1, wherein the processing system, to perform the multi-beam communication based at least in part on the policy to fulfil the grant or not fulfil the grant, is configured to:

perform all or no communications associated with the multi-beam communication, wherein a failure associated with a single beam in the set of beams blocks an entirety of the multi-beam communication, and wherein the failure is indicated based at least in part on receiver assistance information associated with the single beam.

3. The UE of claim 1, wherein the processing system, to perform the multi-beam communication based at least in part on the policy to partially fulfil the grant, is configured to:

perform some transmissions, associated with the multi-beam communication, using one or more beams in the set of beams that are not associated with failures.

4. The UE of claim 1, wherein the processing system, to perform the multi-beam communication based at least in part on the policy to fulfil the grant, is configured to:

perform all transmissions, associated with the multi-beam communication, regardless of any failures associated with the set of beams, wherein the failures are indicated based at least in part on the receiver assistance information.

5. The UE of claim 1, wherein a lack of receiver assistance information for a beam in the set of beams associated with the multi-beam communication indicates that the beam is not protected and is associated with a failure.

6. The UE of claim 1, wherein a beam in the set of beams is associated with a transmission configuration indicator state or a sounding reference signal resource indicator.

7. The UE of claim 1, wherein the processing system is further configured to:

receive, via the one or more antennas from the one or more base stations, a radio resource control parameter that indicates the policy.

8. The UE of claim 1, wherein the processing system is further configured to:

receive, via the one or more antennas from the one or more base stations, a downlink control information indication that indicates the policy.

9. The UE of claim 1, wherein the processing system, to perform the multi-beam communication based at least in part on the policy, is configured to:

fulfil the grant, partially fulfil the grant, or not fulfil the grant based at least in part on a type of scheduling associated with the scheduling information, wherein the type of scheduling associated with the scheduling information is a single downlink control information (DCI) scheduling or a multiple DCI scheduling.

10. The UE of claim 1, wherein:

the scheduling information indicates a downlink grant and the multi-beam communication is a downlink multi-beam transmission from the one or more base stations to the UE; or the scheduling information indicates an uplink grant and the multi-beam communication is an uplink multi-beam transmission from the UE to the one or more base stations.

11. The UE of claim 1, wherein the processing system, to receive the scheduling information, is configured to receive a receiver assistance information request via a pre-grant, and wherein the processing system is further configured to:

perform a receiver assistance measurement of a beam in the set of beams based at least in part on the receiver assistance information request; and transmit, via the one or more antennas to the one or more base stations, an indication that the beam in the set of beams has passed a receiver assistance check based at least in part on the receiver assistance measurement satisfying a threshold.

12. The UE of claim 1, wherein the processing system, to perform the multi-beam communication, is configured to:

transmit, to the one or more base stations, an uplink transmission based at least in part on the receiver assistance information and the policy.

13. The UE of claim 12, wherein the processing system is configured to receive the receiver assistance information via a channel occupancy time structure information (COT-SI) or a downlink control information (DCI) indication, wherein the uplink transmission is transmitted based at least in part on the COT-SI or the DCI indication.

14. The UE of claim 1, wherein the receiver assistance information is associated with one or more parameters.

15. The UE of claim 14, wherein the one or more parameters include: a duration associated with the receiver assistance information, and a mode of receiver assistance corresponding to the policy.

16. The UE of claim 1, wherein a downlink channel associated with each SSB of the SSB sweep indicates a flag for receiver assistance information associated with a corresponding beam in the set of beams.

17. A base station, comprising:

a processing system that includes one or more processors and a memory that stores code for the one or more processors, the processing system configured to:

transmit, to a user equipment (UE), scheduling information for a multi-beam communication between the base station and the UE using a set of beams;

transmit, to the UE, receiver assistance information for the set of beams via a synchronization signal block (SSB) sweep on the set of beams; and perform, with the UE, the multi-beam communication based at least in part on:

the receiver assistance information, and a policy to fulfil a grant, partially fulfil the grant, or not fulfil the grant according to the scheduling information using the receiver assistance information.

18. A method of wireless communication performed by a user equipment (UE), comprising:

receiving, from one or more base stations, scheduling information for a multi-beam communication using a set of beams between the UE and the one or more base stations;

receiving, from the one or more base stations, receiver assistance information for the set of beams via a synchronization signal block (SSB) sweep on the set of beams; and performing, with the one or more base stations, the multi-beam communication based at least in part on:

the receiver assistance information, and a policy to fulfil a grant, partially fulfil the grant, or not fulfil the grant according to the scheduling information using the receiver assistance information.

19. The method of claim 18, wherein performing the multi-beam communication based at least in part on the policy to fulfil the grant or not fulfil the grant comprises:

performing all or no communications associated with the multi-beam communication, wherein a failure associated with a single beam in the set of beams blocks an entirety of the multi-beam communication, and wherein the failure is indicated based at least in part on receiver assistance information associated with the single beam.

20. The method of claim 18, wherein performing the multi-beam communication based at least in part on the policy to partially fulfil the grant comprises:

performing some transmissions, associated with the multi-beam communication, using one or more beams in the set of beams that are not associated with failures.

21. The method of claim 18, wherein performing the multi-beam communication based at least in part on the policy to fulfil the grant comprises:

performing all transmissions, associated with the multi-beam communication, regardless of any failures associated with the set of beams, wherein the failures are indicated based at least in part on the receiver assistance information.

22. The method of claim 18, wherein:

a lack of receiver assistance information for a beam in the set of beams associated with the multi-beam communication indicates that the beam is not protected and is associated with a failure; and a beam in the set of beams is associated with a transmission configuration indicator state or a sounding reference signal resource indicator.

23. The method of claim 18, further comprising:

receiving, from the one or more base stations, a radio resource control parameter or a downlink control information indication that indicates the policy.

24. The method of claim 18, wherein performing the multi-beam communication based at least in part on the policy comprises fulfilling the grant, partially fulfilling the grant, or not fulfilling the grant based at least in part on a type of scheduling associated with the scheduling information, wherein the type of scheduling associated with the scheduling information is a single downlink control information (DCI) scheduling or a multiple DCI scheduling.

25. The method of claim 18, wherein:

the scheduling information indicates a downlink grant and the multi-beam communication is a downlink multi-beam transmission from a base station to the UE; or the scheduling information indicates an uplink grant and the multi-beam communication is an uplink multi-beam transmission from the UE to a base station.

26. The method of claim 18, wherein:

receiving the scheduling information comprises receiving a receiver assistance information request via a pre-grant, and further comprising:

performing a receiver assistance measurement of a beam in the set of beams based at least in part on the receiver assistance information request; and transmitting, to a base station, an indication that the beam in the set of beams has passed a receiver assistance check based at least in part on the receiver assistance measurement satisfying a threshold.

27. The method of claim 18, wherein performing the multi-beam communication comprises transmitting, to a base station, an uplink transmission based at least in part on the receiver assistance information.

28. The method of claim 27, wherein receiving the receiver assistance information comprises receiving the receiver assistance information via a channel occupancy time structure information (COT-SI) or a downlink control information (DCI) indication, wherein the uplink transmission is transmitted based at least in part on the COT-SI or the DCI indication.

29. The method of claim 18, wherein a downlink channel associated with each SSB of the SSB sweep indicates a flag for the receiver assistance information associated with a corresponding beam in the set of beams.

30. A method of wireless communication performed by a base station, comprising:

transmitting, to a user equipment (UE), scheduling information for a multi-beam communication between the base station and the UE using a set of beams;

transmitting, to the UE, receiver assistance information for the set of beams via a synchronization signal block (SSB) sweep on the set of beams; and performing, with the UE, the multi-beam communication based at least in part on: the receiver assistance information, and a policy for fulfilling a grant, partially fulfilling the grant, or not fulfilling the grant according to the scheduling information using the receiver assistance information.

* * * * *